(12) United States Patent
Sikka et al.

(10) Patent No.: US 12,051,039 B1
(45) Date of Patent: *Jul. 30, 2024

(54) INTERACTIVE MACHINE LEARNING ASSISTANT

(71) Applicant: Staples, Inc., Framingham, MA (US)

(72) Inventors: Sandeep Sikka, Natick, MA (US); Nitin Verma, Natick, MA (US); Michael Bhaskaran, Sherborn, MA (US); Xiaowei Lu, Framingham, MA (US); Christopher Yong, Framingham, MA (US)

(73) Assignee: Staples, Inc., Framingham, MA (US)

( * ) Notice: Subject to any disclaimer, the term of this patent is extended or adjusted under 35 U.S.C. 154(b) by 137 days.

This patent is subject to a terminal disclaimer.

(21) Appl. No.: 17/457,906

(22) Filed: Dec. 6, 2021

Related U.S. Application Data

(63) Continuation of application No. 16/521,393, filed on Jul. 24, 2019, now Pat. No. 11,195,143.

(Continued)

(51) Int. Cl.
*G06Q 10/00* (2023.01)
*G06F 9/451* (2018.01)
(Continued)

(52) U.S. Cl.
CPC .......... *G06Q 10/087* (2013.01); *G06F 9/453* (2018.02); *G06N 20/00* (2019.01)

(58) Field of Classification Search
CPC ....... G06Q 10/087; G06F 9/453; G06N 20/00
(Continued)

(56) References Cited

U.S. PATENT DOCUMENTS 11,195,143 B1 * 12/2021 Sikka ................... G06Q 10/087
2014/0075004 A1 * 3/2014 Van Dusen ....... G06F 16/90335
709/223

(Continued)

FOREIGN PATENT DOCUMENTS

WO 2018125881 A1 7/2018

OTHER PUBLICATIONS

Povey, Daniel et al., "The Kaldi Speech Recognition Toolkit," retrieved May 17, 2017, retrieved from https://web.archive.org/web/20170517183603/http://homepages.inf.ed.ac.uk/aghoshal/pubs/asru11-kaldi.pdf, 4 pgs.

(Continued)

*Primary Examiner* — Russell S Glass
(74) *Attorney, Agent, or Firm* — VLP Law Group LLP; Michel Bohn

(57) ABSTRACT

In an example embodiment, a method may generate an item layout map for a shelving unit, where the shelving unit stores item types associated with a product category. The method may determine product attributes associated with the product category and divider configurations of the shelving unit, where a divider configuration divides the shelving unit into one or more candidate regions. The method may generate an ontology entry associated with a product attribute and the divider configuration based on the item layout map and the divider configuration of the shelving unit, the ontology entry indicating a regional entropy values of a product attribute for the candidate regions generated by the divider configuration. In some instances, the method may generate a guidance instruction related to the product attribute of the product category based on the ontology entry and provide the guidance instruction to a user.

20 Claims, 8 Drawing Sheets

Related U.S. Application Data

(60) Provisional application No. 62/877,805, filed on Jul. 23, 2019, provisional application No. 62/702,623, filed on Jul. 24, 2018.

(51) Int. Cl.
*G06Q 10/087* (2023.01)
*G06N 20/00* (2019.01)

(58) Field of Classification Search
USPC .......................................................... 705/28
See application file for complete search history.

(56) References Cited

U.S. PATENT DOCUMENTS

| | | | |
|---|---|---|---|
| 2014/0201126 A1 | 7/2014 | Zadeh et al. | |
| 2015/0066711 A1* | 3/2015 | Chua | G06Q 30/00 705/28 |
| 2016/0134930 A1 | 5/2016 | Swafford | |
| 2018/0190375 A1* | 7/2018 | Chapela | G16H 50/30 |
| 2018/0204111 A1* | 7/2018 | Zadeh | G06V 10/764 |
| 2019/0147228 A1 | 5/2019 | Chaudhuri | |
| 2021/0089040 A1 | 3/2021 | Ebrahimi Afrouzi et al. | |

OTHER PUBLICATIONS

Vesely et al., "Sequence-discriminative Training of Deep Neural Networks," Interspeech 2013, Aug. 25, 2013, retrieved from http://www.fit.vutbr.cz/research/groups/speech/publi/2013/vesely_interspeech2013_IS131333.pdf, 5 pgs.

Povey et al., "Parallel Training of DNNs With Natural Gradient and Parameter Averaging", Dec. 19, 2014, retrieved from https://arxiv.org/pdf/1410.7455v4.pdf, 26 pgs.

Kumar, D S Pavan, "Keras Interface for Kaldi ASR," GitHub 2017, accessed Jul. 2018, retrieved from https://github.com/dspavankumar/keras-kaldi, 3 pgs.

Povey, Daniel, "Models," accessed Jul. 2018, retrieved from https://web.archive.org/web/20180706095918/http://kaldi-asr.org/models.html, 1 page.

Varga, Krisztian "Kaldi ASR: Extending the ASpIRE Model," Mar. 11, 2017, retrieved from https://chrisearch.wordpress.com/2017/03/11/speech-recognition-using-kaldi-extending-and-using-the-aspire-model/, 6 pgs.

Hannun et al., "Deep Speech: Scaling up end-to-end Speech Recognition," Dec. 17, 2014, retrieved from https://arxiv.org/abs/1412.5567, 12 pgs.

Meyer, Josh "How to use an Existing GMM Recognizer for Decoding in Kaldi," Sep. 12, 2016, retrieved from http://jrmeyer.github.io/asr/2016/09/12/Using-built-GMM-model-Kaldi.html, 6 pgs.

Meyer, Josh "How to Train a Deep Neural Net Acoustic Model With Kaldi," Dec. 15, 2016, retrived from http://irmeyer.github.io/asr/2016/12/15/DNN-AM-Kaldi.html, 16 pgs.

University of Edinburgh, "Lab 2: Training Monophone Models," Jan. 30, 2017, retrieved from https://www.inf.ed.ac.uk/teaching/courses/asr/2016-17/lab2.pdf, 7 pgs.

Maas, Andrew, "Homework 2: GMM and Deep Acoustic Modeling," accessed Jun. 22, 2017, retrieved from http://web.archive.org/web/20170622122133/http://web.stanford.edu/class/cs224s/hw2/cs224s_2017_hw2.pdf, 4 pgs.

Gales, Mark, "Deep Learning for Speech Recognition," University of Cambridge, Jul. 2017, retrieved from http://lxmls.it.pt/2017/talk.pdf, 60 pgs.

Coates et al., "Speech Recognition and Deep Learning," Bai du Research, Silicon Valley AI Lab, 2016, retrieved from https://cs.stanford.edu/~acoates/ba_dls_speech2016.pdf, 75 pgs.

Zhang, et al., "Towards End-to-End Speech Recognition With Deep Convolutional Neural Networks," Universite de Montreal, Jan. 10, 2017, retrieved from https://arxiv.org/pdf/1701.02720.pdf, 5 pgs.

Xiong, et al., "Achieving Human Parity in Conversational Speech Recognition," Microsoft Research, Technical Report MSR-TR-2016-71, Feb. 17, 2017, retrieved from https://arxiv.org/pdf/1610.05256v2.pdf, 13 pgs.

Bai Du Research, "Fast Parallel CTC," GitHub, accessed Jun. 27, 2018, retrieved from http://web.archive.org/web/20180627002837/https://github.com/baidu-research/warp-ctc, 5 pgs.

Saon et al., "English Conversational Telephone Speech Recognition by Humans and Machines," IBM Watson, Mar. 6, 2017, retrieved from https://arxiv.org/pdf/1703.02136.pdf, 7 pgs.

Howard, Jeremy, "Neural Network Approaches for NLP / NLU / Dialog / Chatbots," Mar. 7, 2017, retrieved from http://web.archive.org/web/20180712044414/http://forums.fast.ai/t/neural-network-approaches-for-nlp-nlu-dialog-chatbots/1802, 5 pgs.

"CM-Well—a Data Warehouse For Your Knowledge Graph," GitHub, Accessed Jul. 2017, retrieved from https://github.com/CM-Well/CM-Well, 1 page.

Morrison et al., "Are There Open Source Projects That Are Beginning to Tackle Natural language Understanding?" Quora, Jul. 8, 2017, retrieved from https://www.quora.com/Are-there-open-source-projects-that-are-beginning-to-tackle-natural-language-understanding, 3 pgs.

Hixon et al., "Learning Knowledge Graphs for Question Answering through Conversational Dialog," Human Language Technologies: The 2015 Annual Conference of the North American Chapter of the ACL, May 31, 2015, retrieved from http://wing.comp.nus.edu.sg/~antho/N/N15/N15-1086.pdf, 11 pgs.

Petrov, Slav, "Announcing SyntaxNet: The World's Most Accurate Parser Goes Open Source," Google AI Blog, May 12, 2016, retreived from https://ai.googleblog.com/2016/05/announcing-syntaxnet-worlds-most.html, 4 pgs.

Deng, Li. "Deep Learning: Methods and Applications." Foundations and Trends in Signal Processing, vol. 7, Nos. 3-4 (2013): 197-387, retrieved from https://pdfs.semanticscholar.org/9260/a65f84384b0b12b32810e171a3c1cc0c0ffa.pdf, 195 pgs.

Gaida et al., "Comparing Open-Source Speech Recognition Toolkits," Technical Report of the Project Oasis, DHBW Stuttgart, Stuttgart, Germany, Oct. 2014, retrieved from http://ehrai.com/su/pdf/oasis2014.pdf, 12 pgs.

"Speech and Natural Language Processing" GitHub.com, accessed Jun. 11, 2018, retrieved from http://web.archive.org/web/20180601000000*/https://github.com/edobashira/speech-language-processing, 5 pages.

SQuAD2.0 The Stanford Question Answering Dataset, accessed Jul. 12, 2018, retrieved from http://web.archive.org/web/20180712033502/https://rajpurkar.github.io/SQuAD-explorer/, 9 pages.

Serban, Iulian V., et al., "A Deep Reinforcement Learning Chatbot," Nov. 5, 2017, retrieved from http://arxiv.org/abs/1709.02349, 40 pgs.

"Knowledge Graph The Core Libraries of Our AI Platform," Avaamo.ai website, accessed Jun. 3, 2018, retrieved from http://web.archive.org/web/20180601000000*/http://www.avaamo.com/knowledge-services/, 2 pages.

"Ambiverse Natural Language Understanding—AmbiverseNLU," Github.com, accessed Jul. 2018, retrieved from https://github.com/ambiverse-nlu/ambiverse-nlu, 7 pgs.

Dialogflow Overview, "Build Natural and Rich Conversational Experiences", accessed Jul. 2018, retrieved from Dialogflow.com, 3 pgs.

Houndify.com, SoundHound Inc., accessed Jul. 7, 2018, retrieved from http://web.archive.org/web/20180601000000*/https://www.houndify.com/, 6 pages.

"Robot Assistants in Aisle 10; Will Shoppers Buy It?", Knowledge@Wharton, Sep. 7, 2016. Accessed from https://knowledge.wharton.upenn.edu/article/robots-aisle-10-will-shoppers-like/.

Underwood, Corinna, "Robots in Retail—Examples of Real Industry Applications," Market Research Services, accessed Jul. 2018, updated Jun. 19, 2019, retrieved from https://emerj.com/ai-sector-overviews/robots-in-retail-examples/.

Parker, Fiona, "Shop Hires Robot Assistant . . . " The Daily Mail, Jan. 21, 2018, Accessed from https://web.archive.org/web/20180122210959/https://www.dailymail.co.uk/news/article-5295837/Shop-hires-robot-assistant-fires-just-week.html.

(56) References Cited

OTHER PUBLICATIONS

"Information Gain," accessed Jul. 2018, retrieved from https://www3.nd.edu/~rjohns15/cse40647.sp14/www/content/lectures/23%20-%20Decision%20Trees%202.pdf, 34 pgs.

"Using Information Gain to Build Trees," accessed Jul. 2018, retrieved from https://www.coursera.org/lecture/predictive-analytics/using-information-gain-to-build-trees-Orwzh, 1 page.

"Information Gain, Which Test is More Informative?" Accessed Jul. 2018, retrieved from http://courses.cs.washington.edu/courses/cse455/10au/notes/InfoGain.ppt, 13 pgs.

"2nd Approach: Gain Ratio," accessed Jul. 2018, retrieved from http://www.inf.unibz.it/dis/teaching/DWDM/slides2011/lesson5-Classification-2.pdf, 33 pgs.

Library Shelving Entropy, Triple Threat Librarian, Nov. 26, 2013.

\* cited by examiner

INTERACTIVE MACHINE LEARNING ASSISTANT

BACKGROUND

The present disclosure relates to a technology for providing user assistance for users. In a more particular example, this present disclosure relates to providing user assistance for users using robotic devices.

Users may need assistance in a facility. For example, in a retail store or in a warehouse environment, users may need help to find the products, navigate through the store to the location of those products, compare product choices, etc. Many facilities usually rely on human assistants to provide assistance to users. However, human assistance is usually labor intensive and susceptible to errors at scale. For example, human assistants often require hiring and training in order to complete various assistance tasks. In some situations, the scope of the tasks may exceed the capacity of the human assistants to provide assistance to the users at sustained throughput and desired quality. For example, due to the large number of item types in the retail store, human assistants may not be able to memorize the storage locations of various items, and thus may not be able to provide navigational guidance to store visitors. In addition, the users who need assistance may change their mind frequently, and therefore it is usually inefficient or impractical to use human assistants to provide assistance to the users.

SUMMARY

According to one innovative aspect of the subject matter described in this disclosure, a method comprises: generating an item layout map for a shelving unit, the shelving unit storing one or more item types associated with a product category; determining one or more product attributes associated with the product category; determining one or more divider configurations of the shelving unit, a divider configuration in the one or more divider configurations dividing the shelving unit into one or more candidate regions; generating an ontology entry associated with a product attribute in the one or more product attributes and the divider configuration in the one or more divider configurations based on the item layout map and the divider configuration of the shelving unit, the ontology entry indicating one or more regional entropy values of the product attribute for the one or more candidate regions generated by the divider configuration; generating a guidance instruction related to the product attribute of the product category based on the ontology entry; and providing the guidance instruction to a user.

In general, another innovative aspect of the subject matter described in this disclosure may be embodied in methods comprising: determining an ontology entry associated with a product attribute of a product category, the product category including one or more item types placed on a shelving unit, the ontology entry indicating one or more regional entropy values of the product attribute for one or more regions of the shelving unit; receiving, from a user, an input attribute value for the product attribute associated with the ontology entry; determining, from the one or more regions of the shelving unit, a first region based on a regional entropy value of the product attribute for the first region; determining one or more attribute values of the product attribute of one or more first item types stored in the first region; generating, based on the one or more attribute values of the product attribute of the one or more first item types in the first region and the input attribute value, a guidance instruction to navigate the user to a storage position of an item type that satisfies the input attribute value in the shelving unit; and providing the guidance instruction to the user.

In general, another innovative aspect of the subject matter described in this disclosure may be embodied in a system that includes one or more processors and one or more memories storing instructions that, when executed by the one or more processors, cause the system to: generate an item layout map for a shelving unit, the shelving unit storing one or more item types associated with a product category; determine one or more product attributes associated with the product category; determine one or more divider configurations of the shelving unit, a divider configuration in the one or more divider configurations dividing the shelving unit into one or more candidate regions; generate an ontology entry associated with a product attribute in the one or more product attributes and the divider configuration in the one or more divider configurations based on the item layout map and the divider configuration of the shelving unit, the ontology entry indicating one or more regional entropy values of the product attribute for the one or more candidate regions generated by the divider configuration; generate a guidance instruction related to the product attribute of the product category based on the ontology entry; and provide the guidance instruction to a user.

These and other embodiments may each optionally include one or more of the following features, such as: that a candidate region in the one or more candidate regions generated by the divider configuration includes one or more space units, and generating the ontology entry associated with the product attribute and the divider configuration includes computing a regional entropy value of the product attribute for the candidate region based on a probability of space units in the candidate region that are associated with an attribute value of the product attribute; that computing a first entropy value of the product attribute for the shelving unit based on a probability of space units in the shelving unit that are associated with an attribute value of the product attribute, and computing a second entropy value of the product attribute for the shelving unit based on the one or more regional entropy values of the product attribute for the one or more candidate regions generated by the divider configuration; that computing an information gain ratio associated with the product attribute and the divider configuration based on (1) the first entropy value of the product attribute for the shelving unit and (2) the second entropy value of the product attribute for the shelving unit, determining that the information gain ratio associated with the product attribute and the divider configuration satisfies an information gain ratio threshold, and responsive to determining that the information gain ratio associated with the product attribute and the divider configuration satisfies the information gain ratio threshold, generating the ontology entry associated with the product attribute and the divider configuration; that generating the ontology entry associated with the product attribute and the divider configuration includes aggregating into the ontology entry one or more of the product category, the product attribute, the divider configuration, the one or more candidate regions generated by the divider configuration, and the one or more regional entropy values of the product attribute for the one or more candidate regions, and storing the ontology entry in a data store; that the shelving unit includes one or more space dividers, and determining the one or more divider configurations of the shelving unit includes activating one or more first space dividers in the one or more space dividers of the shelving unit, the one or more first space dividers dividing the shelving unit into the one or more candidate regions associated with the divider configuration; that determining the item layout map of the shelving unit includes determining planogram data describing a placement layout of the one or more item types on the shelving unit, determining item data indicating one or more attribute values of the one or more product attributes for the one or more item types, and generating the item layout map of the shelving unit based on the planogram data and the item data.

These and other embodiments may each optionally include one or more of the following features, such as: that regional entropy value of the product attribute for a region in the shelving unit indicates a purity level of attribute values of the product attribute in the region, and determining the first region from the one or more regions of the shelving unit includes determining that the first region has the regional entropy value of the product attribute for the first region satisfying a regional entropy value threshold; that generating the guidance instruction includes performing a comparison between the one or more attribute values of the product attribute of the one or more first item types in the first region and the input attribute value, determining that the first region stores the item type satisfying the input attribute value based on the comparison, and responsive to determining that the first region stores the item type satisfying the input attribute value, generating the guidance instruction navigating the user to the first region of the shelving unit; that generating the guidance instruction includes performing a comparison between the one or more attribute values of the product attribute of the one or more first item types in the first region and the input attribute value, determining that the first region does not store the item type satisfying the input attribute value based on the comparison, and responsive to determining that the first region does not store the item type satisfying the input attribute value, generating the guidance instruction navigating the user to another region of the shelving unit; that the shelving unit includes one or more space units, and determining the one or more attribute values of the product attribute of the one or more first item types stored in the first region includes mapping the first region to an item layout map of the shelving unit, the item layout map indicating one or more attribute values of one or more product attributes of an item type stored in a space unit of the shelving unit; that receiving the input attribute value from the user includes receiving the input attribute value in a conversational dialog with the user, and providing the guidance instruction to the user includes providing the guidance instruction to the user in the conversational dialog with the user.

Other implementations of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DESCRIPTION

Figure 1:
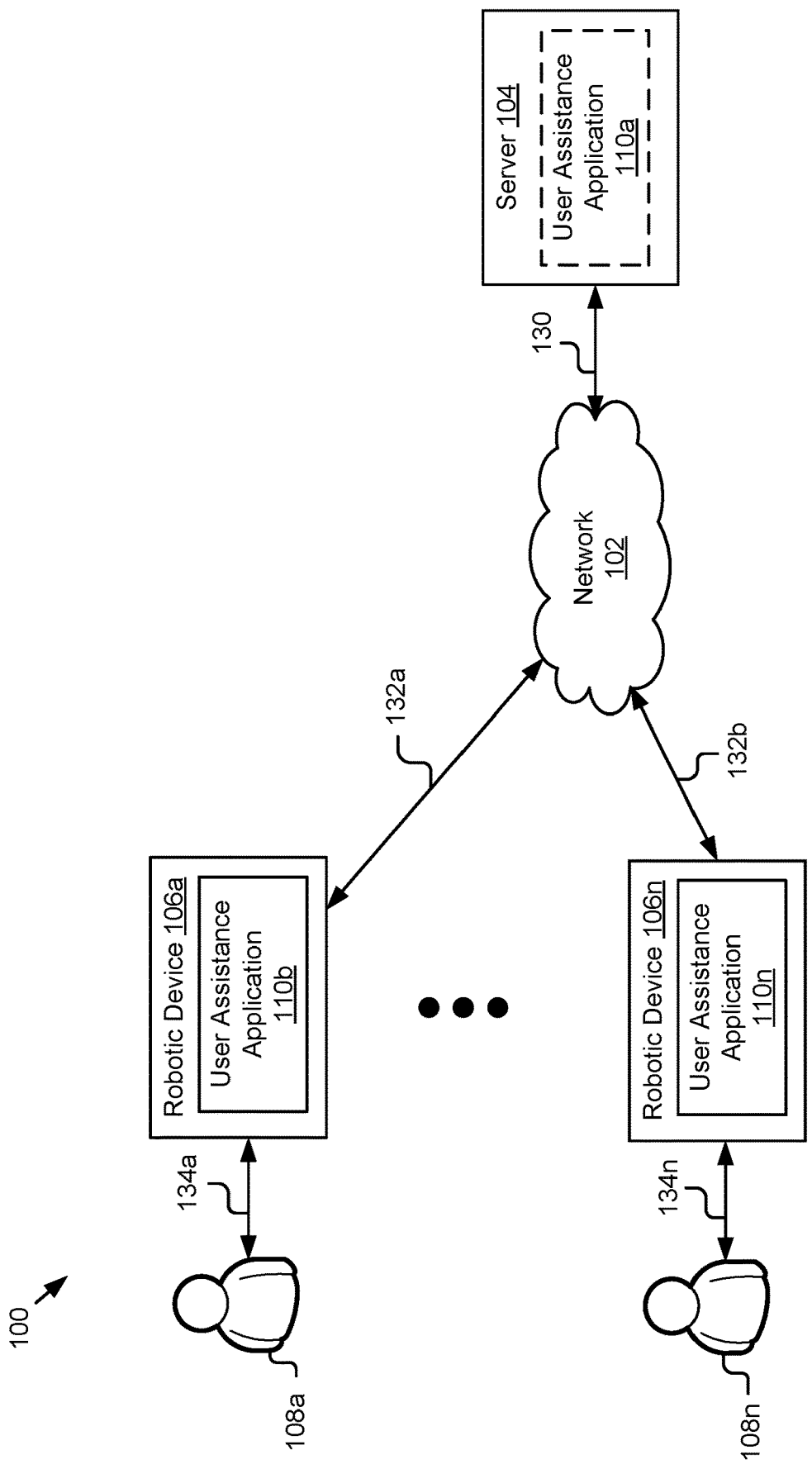
FIG. 1 is a block diagram of an example system for providing user assistance to users.

The technology presented in this disclosure improves upon existing approaches and is advantageous in a number of respects. For example, the technology described herein may provide a robotic device that can replace human assistants in providing assistance to users. The user referred to herein may be a user that needs assistance to perform a task (e.g., find an item type) in an environment that the user may not be familiar with (e.g., a retail store, warehouse, fulfillment center, etc.). As discussed elsewhere herein, the technology may implement a data mining algorithm that can automatically derive ontology data from storage layout data of the facility. For example, a first environment may lay out a product category (e.g., printer) by brand name, while a second environment may lay out the same product category by price. For each environment, the data mining algorithm may analyze the storage layout data of the facility at the level of shelf and/or item type, automatically determine the ontology data describing how various item types are organized for the product category in the retail store, and the robotic device may use the ontology data to provide guidance instructions to the users. In this example, the robotic device in the first environment may request for user input regarding "brand name," while the robotic device in the second environment may request for user input regarding "price." The robotic device may determine storage aisles or racks that store one or more item types satisfying the user input, and provide guidance instruction for the user to navigate to these locations. The robotic device may also provide navigation guidance for the user to proceed in the retail store with the presence of other users, robotic devices, and/or other obstacles.

As another example, the technology described herein may include a conversational model and/or a visual model that enables the robotic device to communicate with the users through speech and/or vision. Therefore, the present technology can eliminate the need for the user to hold, wear, or otherwise be attached to an external device to receive the assistance and/or guidance via the external device (e.g., speaker, headset, etc.), thereby providing a hands-free experience for the user. The present technology may also enable the robotic device to analyze the user interaction to adjust its engagement with the user. For example, the robotic device may observe the user (e.g., using a camera of the robotic device), apply the visual model to determine the emotional state of the user based on one or more visual cues (e.g., whether the user is in a rush, whether the user is frustrated, etc.), and provide assistance to the user accordingly. The robotic device may also apply the conversational model to adjust the flow of speech based on the user interaction of the user. As the robotic device may engage with the user in a natural, human-like manner via speech and vision to provide automated assistance, the user experience can be significantly improved, thereby facilitating the decision making process of the user. For example, in the retail store context, providing useful assistance to help the user find the item types of interest, compare similar products, etc., may increase the likelihood of the users making purchase decisions. In a warehouse or fulfillment center context, the technology may provide assistance to a warehouse associate, thereby allowing items to be found, replenished, picked, etc., faster and more efficiently. In addition, the present technology may also enable the robotic device to analyze the user interaction to provide feedback for optimizing the storage layout of the facility. For example, the robotic device may provide a feedback that the item types of a product category are organized based on brand name while the users usually provide user input regarding price for this product category. As a result, the facility manager may determine that the item types of the product category should be reorganized based on price.

The technology described herein may be implemented in various types of assistant devices and applicable in multiple use case scenarios. For example, the present technology may be implemented in a store assistant robot to help store visitors quickly navigate to the storage location of a particular item type. In another example, the present technology may be implemented in a warehouse robot (e.g., a pick-and-pack robot) to help human agents pick and pack cartons to fulfill customer orders. In some embodiments, the present technology may be implemented in a virtual agent (e.g., laptop assistant) and/or software applications installed on electronic devices (e.g., mobile applications on smartphones) to provide assistance to users as the users perform various tasks in the domain that they may not be familiar with. Other use case scenarios of the present technology are also possible and contemplated.

As discussed elsewhere herein, the technology may include a conversational model. In some embodiments, the conversational model may be trained with various sentences as training examples. Once the training process is completed, the conversational model may be implemented in various types of assistant devices to interact with the users via a conversational interface. For example, the conversational model may be implemented in an electronic device assistant (e.g., a laptop assistant). The electronic device assistant may communicate with the user via the conversational interface to help the user to perform various tasks with various devices (e.g., printer, fax machine, etc.). Non-limiting examples of the task include, but are not limited to, dispatching printing jobs to a printer, ranking order printers in the vicinity for dispatching the print job, setting up a print order through the various options, contacting Information Technology (IT) department with a Helpdesk ticket if the most suitable printer is backed or blocked, communicating with a robot to fetch the printed copy, storing documents using archival storage options (e.g., local storage, cloud storage, etc.), etc. In another example, the conversational model may be implemented in a digital room assistant. The digital room assistant may be deployed on a user device, and may communicate with the user via the conversational interface to help the user control various devices in the room (e.g., smart-home devices, Internet-of-thing (IoT) devices, etc.), thereby adjusting various conditions of the room (e.g., lighting condition, heating condition, motorized shades, building guide, etc.).

In another example, the conversational model may be implemented in a store assistant device (e.g., an assistant robot). The store assistant device may communicate with the user via the conversational interface, thereby improving the customer experience of the user in the store. In some embodiments, the store assistant device may help the user park close to the nearest store entrance, meet and greet the user at the door on arrival, guide the user to the storage aisle at which an item of interest is located interested, help the user narrow down the item type as the user navigates within the store, manage the wait time the user has to wait for a store employee to become available, etc. In another example, the conversational model may be implemented in a museum assistant device (e.g., an assistant robot). The museum assistant device may communicate with the user via the conversational interface, thereby improving the visiting experience of the user in the museum. In some embodiments, the museum assistant device may communicate with the users to understand their tastes and preferences to recommend galleries to visit, communicate with users to provide information and answer questions as the users view a particular exhibit, help the users in the same group to coordinate with one other. In some embodiments, the museum assistant device may dynamically adjust the communication level of the conversational interface based on the interaction of the users. In another example, the conversational model may be implemented in a warehouse assistant device (e.g., warehouse robot). The warehouse assistant device may communicate with the user (e.g., a human agent) via the conversational interface to help the user perform various tasks in the warehouse (e.g., preparing shipping packages, etc.). In some embodiments, the human agent may control the warehouse assistant device via the conversational interface. Other implementation of the conversational model are also possible and contemplated.

Figure 8:
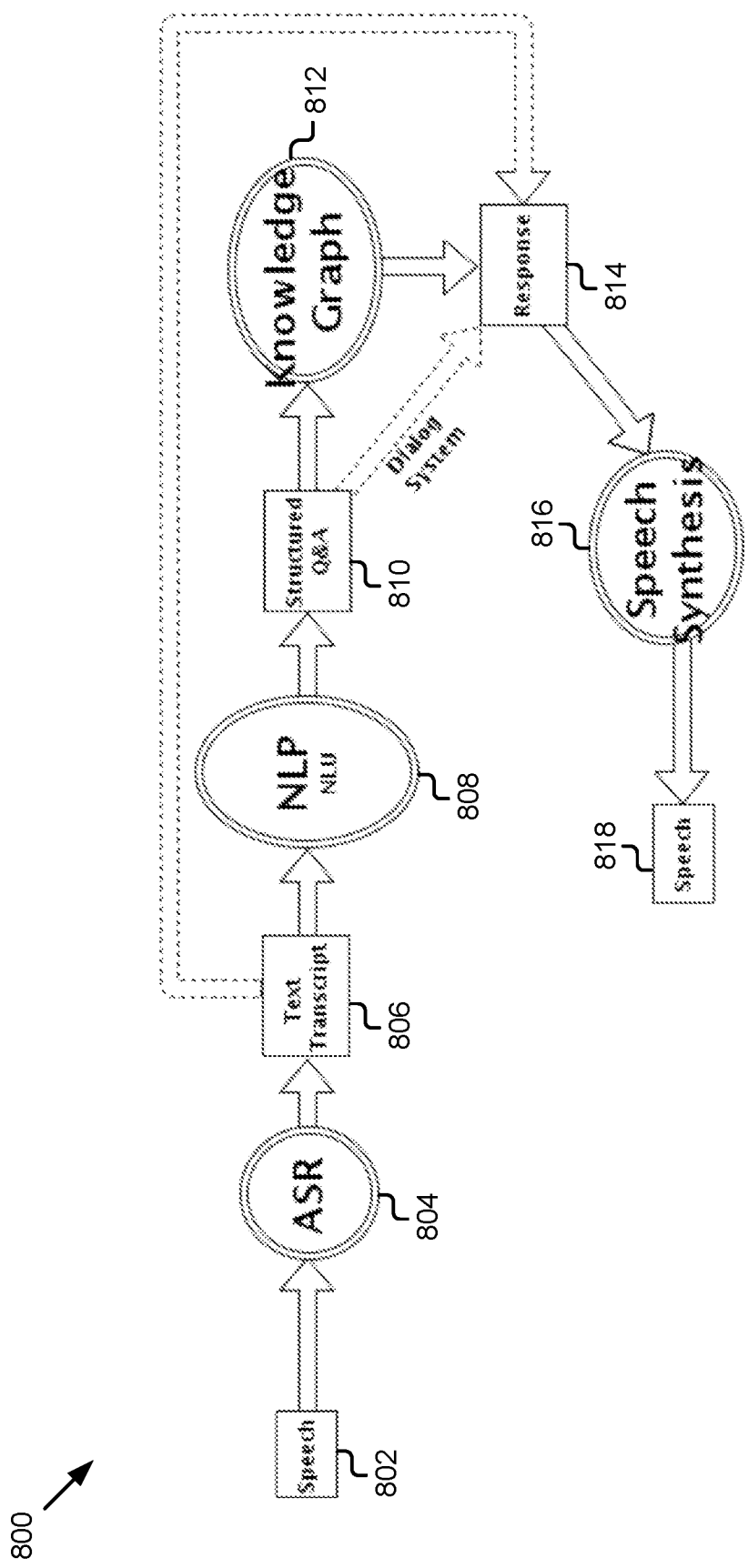
FIG. 8 illustrates an example conversational model for providing a conversational interface.

FIG. 8 illustrates an example conversational model 800 for providing the conversational interface. As depicted in FIG. 8, the conversational model 800 may receive speech input 802 from a user. The conversational model 800 may apply Automated Speech Recognition (ASR) processing 804 on the speech 802 to generate a text transcript 806 of the speech 802, and apply Natural Language Processing (NLP) 808 on the text transcript 806 to identify structured Question and Answer (Q&A) data 810 in the text transcript 806. The conversational model 800 may then generate a response 814 based on a knowledge graph 812, the structured Q&A 810, and/or the text transcript 806. In some embodiments, the conversational model 800 may perform the speech synthesis 816 to synthesize the response 814 to generate a response speech 818. The robotic device (e.g., the assistant robot) may then verbally communicate the response speech 818 to the user.

FIG. 1 is a block diagram of an example system 100 for providing user assistance to users. As shown, the system 100 includes a server 104 and one or more robotic devices 106a . . . 106n coupled for electronic communication via a network 102, the one or more robotic devices 106a . . . 106n may interact with one or more users 108a . . . 108n. In FIG. 1 and the remaining figures, a letter after a reference number, e.g., "106a," represents a reference to the element having that particular reference number. A reference number in the text without a following letter, e.g., "106," represents a general reference to instances of the element bearing that reference number. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of robotic devices 106, networks 102, servers 104, or users 108.

The network 102 may be a conventional type, wired and/or wireless, and may have numerous different configurations including a star configuration, token ring configuration, or other configurations. Furthermore, the network 102 may include one or more local area networks (LAN), wide area networks (WAN) (e.g., the Internet), personal area networks (PAN), cellular networks, public networks, private networks, virtual networks, virtual private networks, peer-to-peer networks, near field networks (e.g., Bluetooth, NFC, etc.), and/or other interconnected data paths across which multiple devices may communicate.

The network 102 may also be coupled to or include portions of a telecommunications network for sending data in a variety of different communication protocols. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other suitable protocols. In some embodiments, the network 102 is a wireless network using a connection such as DSRC (Dedicated Short Range Communication), WAVE, 802.11p, a 3G, 4G, 5G+ network, WiFi™ satellite networks, or other suitable networks. Although FIG. 1 illustrates a single block for the network 102 that couples to the server 104 and the robotic devices 106, it should be understood that the network 102 may in practice comprise any number of combination of networks, as noted above.

The server 104 may be a hardware and/or virtual server that includes a processor, a memory, and network communication capabilities (e.g., a communication unit). The server 104 may be communicatively coupled to the network 102, as reflected by signal line 130. In some embodiments, the server 104 may send and receive data to and from other entities of the system 100 (e.g., the robotic devices 106). As depicted, the server 104 may include an instance 110a of a user assistance application 110 as further discussed elsewhere herein.

The robotic device 106 may be a computing device that includes a processor, a memory, and network communication capabilities (e.g., a communication unit). The robotic device 106 may be communicatively coupled to the network 102, as reflected by signal line 132. In some embodiments, the robotic device 106 may send and receive data to and from other entities of the system 100, e.g., the server 104, other robotic devices 106, etc. As depicted, the robotic device 106a . . . 106n may include instances 110b 110n of a user assistance application 110, as further discussed elsewhere herein.

In some embodiments, the robotic device 106 may include visual capabilities and conversational capabilities to communicate with the users 108 through speech and vision to provide user assistance to the users 108 via user communication channel 134. As an example, the robotic device 106 may receive a voice input from a user 108 via an input device, the voice input may specify a price range of printers in which the user 108 is interested. In this example, the robotic device 106 may provide a guidance instruction to the user 108 via an output device, the guidance instruction may navigate the user 108 to storage locations of the printers that satisfy the price range specified in the voice input. In some embodiments, the robotic device 106 may be capable of moving from one point to another, and thus the robotic device 106 can accompany the user 108 as the user 108 proceeds in the facility. Non-limiting examples of the robotic device 106 include, but are not limited to, assistant robot, warehouse robot, virtual assistant agent implemented on electronic devices (e.g., laptop assistant), etc. In some embodiments, the system 100 may include the robotic devices 106 of the same or different types. In some embodiments, multiple robotic devices 106 may assist the same user 108. For example, a first robotic device 106 may greet the user 108 as the user 108 enters the retail store, and a second robotic device 106 may help the user 108 locate the item types of interest in the retail store, etc.

Other variations and/or combinations are also possible and contemplated. For instance, in some implementations, an instance of the user assistance application 110 may be executable on or accessible via a mobile computing device, such as a laptop computer, smartphone, wearable device, etc. It should be understood that the system 100 illustrated in FIG. 1 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

Figure 2:
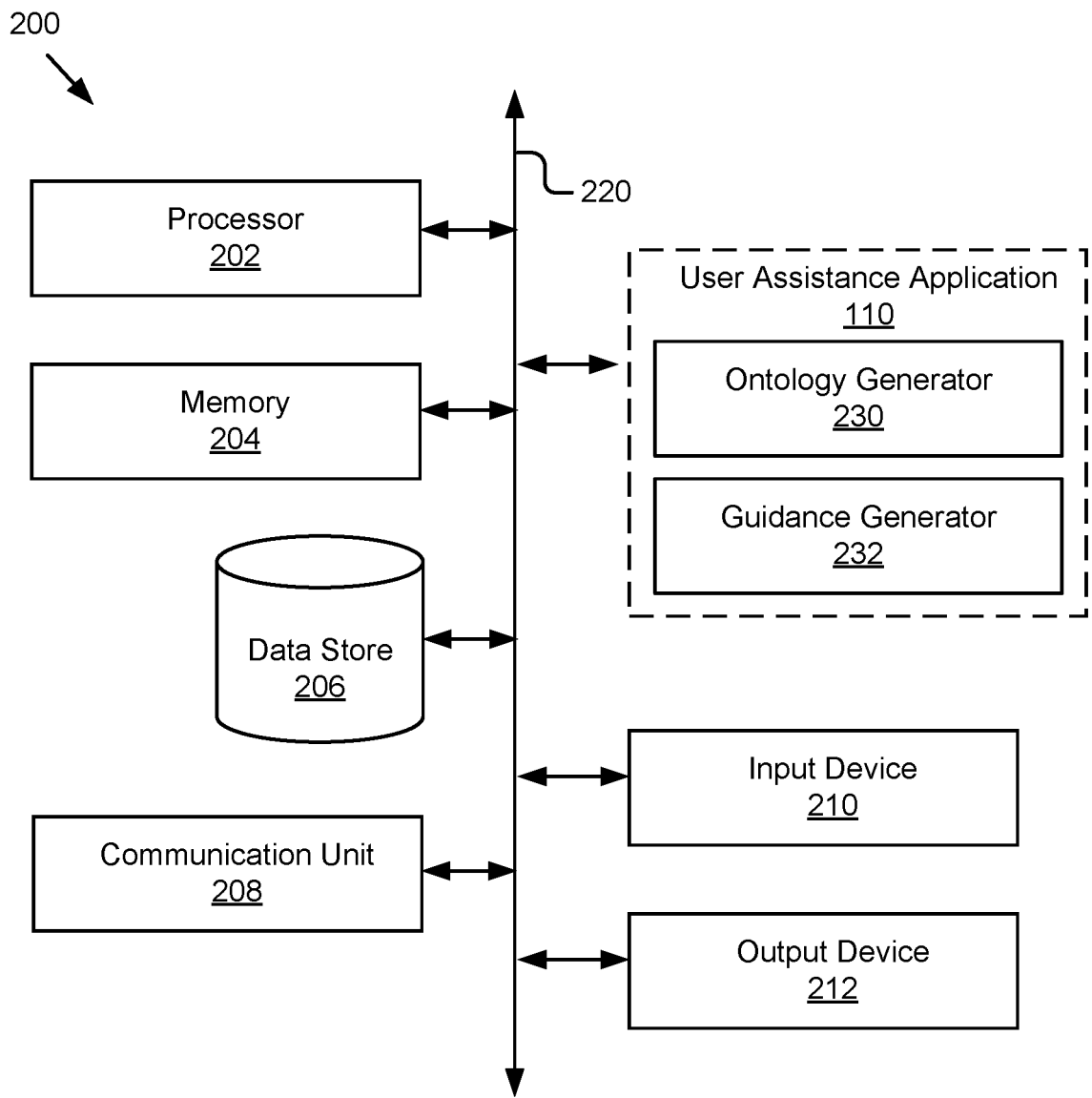
FIG. 2 is a block diagram of an example computing device for providing user assistance to the users.

FIG. 2 illustrates an example computing device 200 for providing user assistance to the users. The computing device 200 may represent the architecture of the robotic device 106. As depicted, the computing device 200 may include a processor 202, a memory 204, a data store 206, a communication unit 208, a user assistance application 110, one or more input devices 210, and one or more output devices 212. The components of the computing device 200 may be communicatively coupled by a bus 220. The computing device 200 depicted in FIG. 2 is provided by way of example and it should be understood that they may take other forms and include additional or fewer components without departing from the scope of the present disclosure. For example, various components of the computing device 200 may be coupled for communication using a variety of communication protocols and/or technologies including, for example, communication buses, software communication mechanisms, computer networks, etc. While not shown, the computing device 200 may include various operating systems, sensors, additional processors, and other physical configurations. Although FIG. 2 only illustrates a single processor 202, memory 204, data store 206, etc., it should be understood that the computing device 200 may include a plurality of instances for one or more of these components.

The processor 202 may execute software instructions by performing various input, logical, and/or mathematical operations. The processor 202 may have various computing architectures to method data signals including, for example, a complex instruction set computer (CISC) architecture, a reduced instruction set computer (RISC) architecture, and/or an architecture implementing a combination of instruction sets. The processor 202, which may include one or more processors, may be physical and/or virtual, and may include a single core or plurality of processing units and/or cores. In some embodiments, the processor 202 may be capable of generating and providing electronic signals to other computing entities (e.g., server, other robotic devices, etc.), performing complex tasks such as data mining, speech recognition, etc. In some embodiments, the processor 202 may be coupled to the memory 204 via the bus 220 to access data and instructions therefrom and store data therein. The bus 220 may couple the processor 202 to the other components of the computing device 200 including, for example, the user assistance application 110, the memory 204, the data store 206, the communication unit 208, the input device 210, and/or the output device 212.

The memory 204 may store and provide access to data to the other components of the computing device 200. The memory 204 may be included in a single computing device or a plurality of computing devices. In some embodiments, the memory 204 may store instructions and/or data that may be executed by the processor 202. For example, the memory 204 may store computer logic executed by the user assistance application 110, depending on the configuration. The memory 204 is also capable of storing other instructions and data, including, for example, an operating system, hardware drivers, software applications, databases, etc. The memory 204 may be coupled to the bus 220 for communication with the processor 202 and other components of computing device 200. The memory 204 may include a non-transitory computer-usable (e.g., readable, writeable, etc.) medium, which can be any non-transitory apparatus or device that can contain, store, communicate, propagate, or transport instructions, data, computer programs, software, code, routines, etc., for processing by or in connection with the processor 202. In some embodiments, the memory 204 may include one or more of volatile memory and non-volatile memory (e.g., RAM, ROM, hard disk, optical disk, etc.). It should be understood that the memory 204 may be a single device or may include multiple types of devices and configurations.

The bus 220 may include a communication bus for transferring data between components of a computing device or between computing devices, a network bus system including a network or portions thereof, a processor mesh, a combination thereof, etc. In some embodiments, the server, the user assistance application 110, and various other components operating on the computing device 200 (operating systems, device drivers, etc.) may cooperate and communicate via a communication mechanism included in or implemented in association with the bus 220. The software communication mechanism may include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. In some embodiments, any or all of the communication can be secure (e.g., SSH, HTTPS, etc.).

The communication unit 208 may include one or more interface devices (I/F) for wired and wireless connectivity among the computing entities of the system (e.g., the server, the robotic devices, etc.). For example, the communication unit 208 may include, but is not limited to, various types known connectivity and interface options. The communication unit 208 may be coupled to other components of the computing device 200 via the bus 220. The communication unit 208 may be coupled to a network (e.g., the Internet, an intranet, etc.), depending on the configuration. In some embodiments, the communication unit 208 may link the processor 202 to the network, which may in turn be coupled to other processing systems. The communication unit 208 may provide other connections to a network, servers, and/or computing devices using various standard communication protocols.

The data store 206 may include a non-transitory storage medium that stores various types of data and provides access to the data. The data stored by the data store 206 may be organized and queried using various criteria. For example, the data store 206 may include data tables, databases, or other organized collections of data. In some embodiments, the data store 206 may be included in the computing device 200 or in another computing system and/or storage system distinct from but coupled to or accessible by the computing device 200. In some embodiments, the data store 206 may be incorporated with the memory 204 or may be distinct therefrom. In some embodiments, the data store 206 may store data associated with a database management system (DBMS) operable on the computing device 200. For example, the DBMS could include a structured query language (SQL) DBMS, a NoSQL DBMS, various combinations thereof, etc. In some instances, the DBMS may store data in multi-dimensional tables comprised of rows and columns, and manipulate, e.g., insert, query, update and/or delete, rows of data using programmatic operations.

In some embodiments, the data stored by the data store 206 may include, but is not limited to, planogram data, item data, ontology data, divider configuration data, etc. In some embodiments, the planogram data may describe a placement layout of one or more item types associated with a product category on a shelving unit. In some embodiments, a product category may represent a type of product (e.g., printer, copy paper, highlighter, etc.) and may include one or more item types. In some embodiments, the product category may be associated with one or more product attributes. Different product categories may be associated with different product attributes. For example, the product category "printer" may be associated with product attribute "brand name," product attribute "cartridge type," product attribute "paper type," product attribute "color type," etc. On the other hand, the product category "copy paper" may be associated with product attribute "brand name," product attribute "paper size," product attribute "brightness," product attribute "number of sheets per ream," etc.

In some embodiments, an item type may represent a type of item belonging to a product category and may be uniquely identified by an item type identifier (e.g., Stock Keeping Unit—SKU). For example, the product category "printer" may include various types of printers, and each type of printer may be uniquely identified by a SKU. In some embodiments, for an item type, the data store 206 may store item data indicating the attribute values of the item type for the product attributes of the product category to which the item type belongs. Continuing the above example, the item data of the item type associated with the SKU "P03311" in the product category "printer" may indicate that the item type has the attribute value for the product attribute "brand name" as "Brand A," the attribute value for the product attribute "cartridge type" as "inkjet," the attribute value for the product attribute "paper type" as "letter," the attribute value for the product attribute "color type" as "black and white," etc. Other types of data are also possible and contemplated.

The input device 210 and the output device 212 may include one or more devices for inputting information to and outputting information from the computing device 200, respectively. The input device 210 and the output device 212 may be coupled to the computing device 200 directly or through intervening Input/Output (I/O) controllers. Non-limiting examples of the input device 210 may include a screen (e.g., LED (Light Emitting Diode)-based display, touch screen) for receiving user input (e.g., product category, brand name, price range, etc.), an audio capture device (e.g., microphone) for capturing sound, voice input, and/or voice commands, a visual sensor (e.g., camera) for observing the user 108 and/or capturing images of the surrounding environment, a keyboard (e.g., a virtual keyboard), a pointing device (e.g., a virtual mouse device), etc. Non-limiting example of the output device 212 may include the screen for displaying visual information to the user 108 (e.g., product attributes of the item type, facility map indicating storage location of the item type, etc.), an audio reproduction device (e.g., speaker) for outputting sound information to the user 108, an indicator (e.g., light indicator indicating status of robotic device), etc. Other types of input devices and output devices for facilitating communication and interaction with the user 108 are also possible and contemplated.

The user assistance application 110 may include computer logic executable by the processor 202 to provide user assistance to the users. In some embodiments, the user assistance application 110 may be implemented using software executable by one or more processors of one or more computer devices, using hardware, such as but not limited to a field-programmable gate array (FPGA), an application-specific integrated circuit (ASIC), etc., and/or a combination of hardware and software, etc. In some embodiments, the user assistance application 110 may communicate with other components of the computing device 200 via the bus 220 and/or the processor 202, and communicate with other entities of the system via the network. In some embodiments, the user assistance application 110 may be a set of instructions executable by the processor 202 to provide its functionality. In further embodiments, the user assistance application 110 may be storable in the memory 204 and accessible and executable by the processor 202 to provide its functionality. In any of the foregoing embodiments, the user assistance application 110 may be adapted for cooperation and communication with the processor 202 and other components of the computing device 200. For example, the user assistance application 110 may receive input data from the input device 210 (e.g., captured images, voice input, etc.), process the input data, and provide output data via the output device 212 (e.g., guidance instruction, product information, etc.). As depicted in FIG. 1, the user assistance application 110 may be implemented in the robotic device 106 and/or the server 104.

As illustrated in FIG. 2, in some implementations, the user assistance application 110 may include an ontology generator 230 and a guidance generator 232, although it should be understood that the user assistance application 110 may include additional components such as, but not limited to, a configuration engine, a training engine, an encryption engine, etc., and/or these various components may be combined into a single component or divided into additional components. The ontology generator 230 and the guidance generator 232 may be implemented as software, hardware, or a combination of the foregoing. The ontology generator 230 and the guidance generator 232 may be communicatively coupled by the bus 220 and/or the processor 202 to one another and/or the other components of the computing device 200. In some embodiments, one or more of the components 110, 230 and/or 232 are sets of instructions executable by the processor 202 to provide their functionality. In further embodiments, one or more of the components 110, 230 and/or 232 are storable in the memory 204 and are accessible and executable by the processor 202 to provide their functionality. In any of the foregoing embodiments, these components 110, 230 and/or 232 may be adapted for cooperation and communication with the processor 202 and other components of the computing device 200. The user assistance application 110 is described in details below with reference to at least FIGS. 3-8.

In some embodiments, to provide user assistance to users in an operating environment such as a facility, the user assistance application 110 may analyze the storage layout data of the facility, generate the ontology data describing the organization pattern of various item types in the facility, and generate a guidance instruction based on the ontology data. The user assistance application 110 may then provide the guidance instruction to the user to assist the user in the facility. For example, the guidance instruction may navigate the user to storage locations of item types in which the user is interested. The operations of the user assistance application 110 are described below in the context of assisting a user to navigate to storage locations where item types of interest are located in a retail store. It should be understood that the operations of the user assistance application 110 are also applicable in other scenarios to assist the user with other situations in other operating environments.

Figure 3:
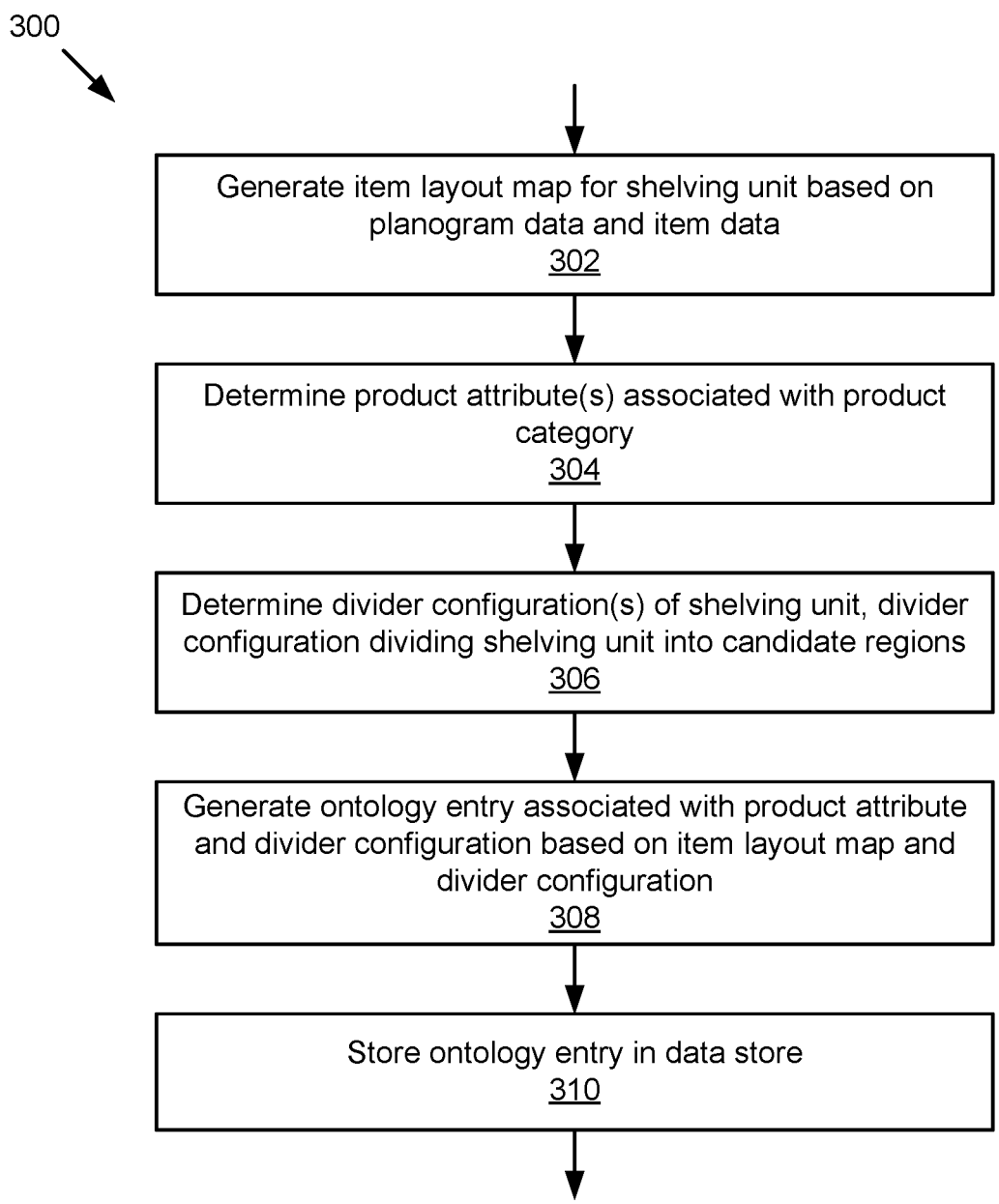
FIG. 3 is a flowchart of an example method for generating ontology data.

FIG. 3 is a flowchart of an example method 300 for generating ontology data. In some embodiments, the ontology data may include one or more ontology entries. An ontology entry may describe how item types associated with a product category are organized on a shelving unit based on various attribute values of a product attribute, for instance. For example, a product category "printer" may include 10 item types (e.g., 10 types of printers uniquely identified by 10 SKUs) stored on a shelving unit. Given the particular placement of these item types on the shelving unit, the ontology data may include a first ontology entry describing how the item types are organized on the shelving unit based on the attribute values of the product attribute "price." The ontology data may also include a second ontology entry describing how the item types are organized on the shelving unit based on the attribute values of the product attribute "brand name." Thus, in this example, the robotic device 106 may rely on these ontology entries to instruct a user to navigate to different regions of the shelving unit based on the price of the printer and/or the brand name of the printer for which the user is looking.

As discussed elsewhere herein, a product category may include one or more item types stored on a shelving unit. In some embodiments, the shelving unit may be a portion of a storage aisle and may include one or more racks, a rack may include one or more shelves for placing items of the item types belonging to the product category. In some embodiments, the shelving unit may include one or more space dividers that divide the shelving unit into one or more space units. The space dividers may be a physical space divider (e.g., shelf and/or wall of the rack) or a virtual space divider. In some embodiments, the ontology generator 230 may activate or inactivate one or more space dividers of the shelving unit to generate a divider configuration. The ontology generator 230 may consider the activated space dividers to be present, and disregard the inactivated space dividers in the divider configuration. In some embodiments, the activated space dividers may divide the shelving unit into one or more regions. A region may include one or more space units of the shelving unit, and a space unit may store one or more item types associated with the product category.

Figure 6:
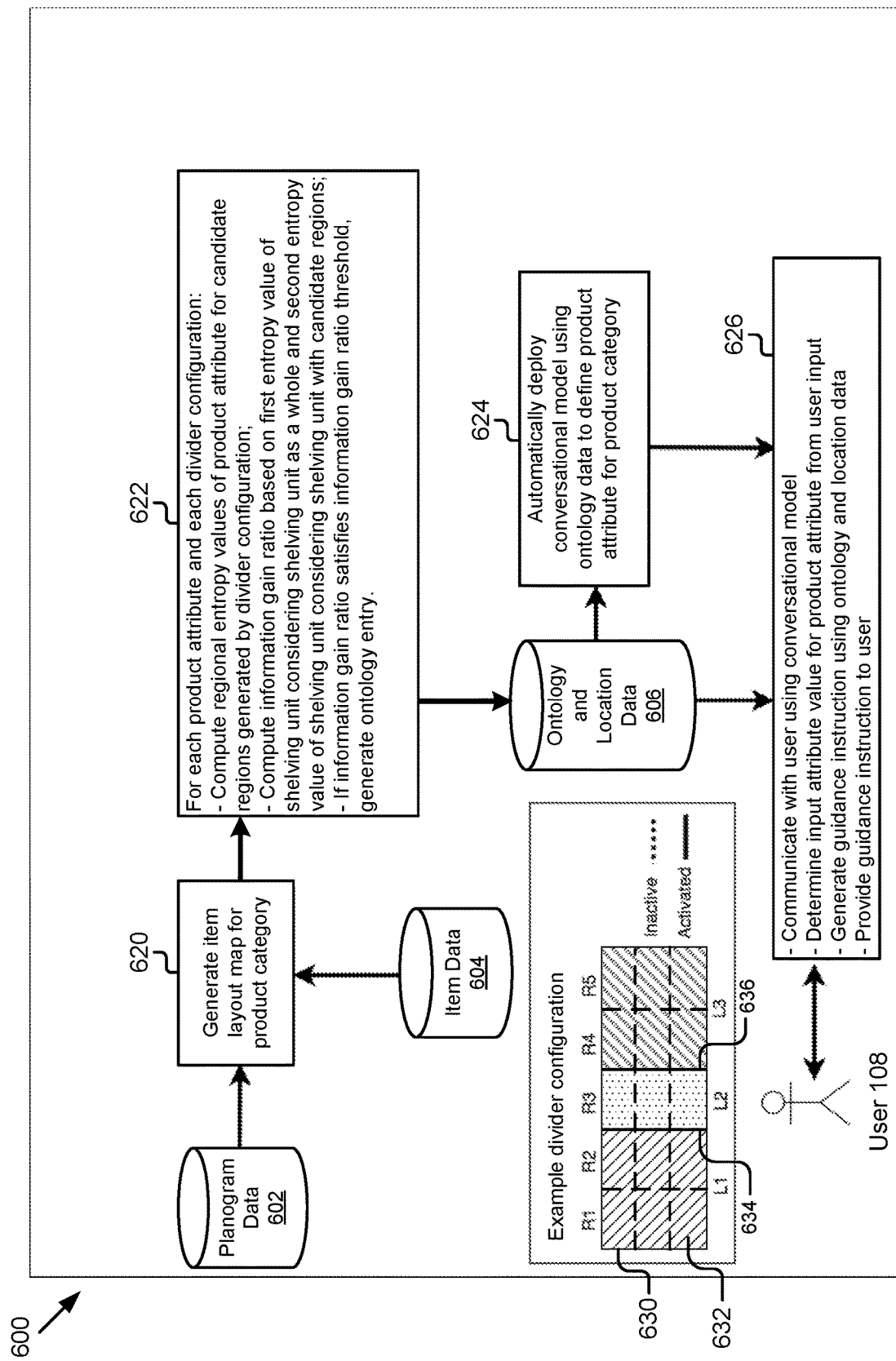
FIG. 6 is a diagram of an example framework for generating the ontology data and generating the guidance instruction for the user based on the ontology data.

An example divider configuration is illustrated in FIG. 6. As depicted, the shelving unit 630 may include 5 racks (R1-R5) and each rack may include 3 shelves. In this divider configuration, the space divider 634 between rack R2 and rack R3, and the space divider 636 between rack R3 and rack R4 may be activated while other space dividers of the shelving unit 630 may be inactivated. Thus, the space divider 634 and the space divider 636 may divide the shelving unit 630 into region L1, region L2, and region L3. As depicted, the region L1 may include the space units 632 of rack R1 and rack R2, the region L2 may include the space units 632 of rack R3, and the region L3 may include the space units 632 of rack R4 and rack R5.

In block 302, the ontology generator 230 may generate an item layout map for the shelving unit based on the planogram data and the item data. In some embodiments, the ontology generator 230 may determine the planogram data of the shelving unit. The planogram data may include a planogram describing the placement layout on the shelving unit of one or more item types belonging to the product category. For example, the planogram may indicate the storage position at which items of an item type are or may be stored on the shelving unit (e.g., (X, Y, Z) coordinates of the space unit storing the items of the item type). In some embodiments, the ontology generator 230 may determine item data describing the one or more item types. As discussed elsewhere herein, the item data of an item type may indicate the attribute values of the item type for one or more product attributes associated with the product category to which the item type belongs. For example, for the item type associated with the SKU "P03311" in the product category "printer," the item data of the item type may indicate the attribute value of product attribute "brand name" as "Brand A," the attribute value of product attribute "price" as "$150," the attribute value of product attribute "cartridge type" as "laserjet," the attribute value of product attribute "paper type" as "photo," the attribute value of product attribute "color type" as "greyscale," etc.

Figure 7:
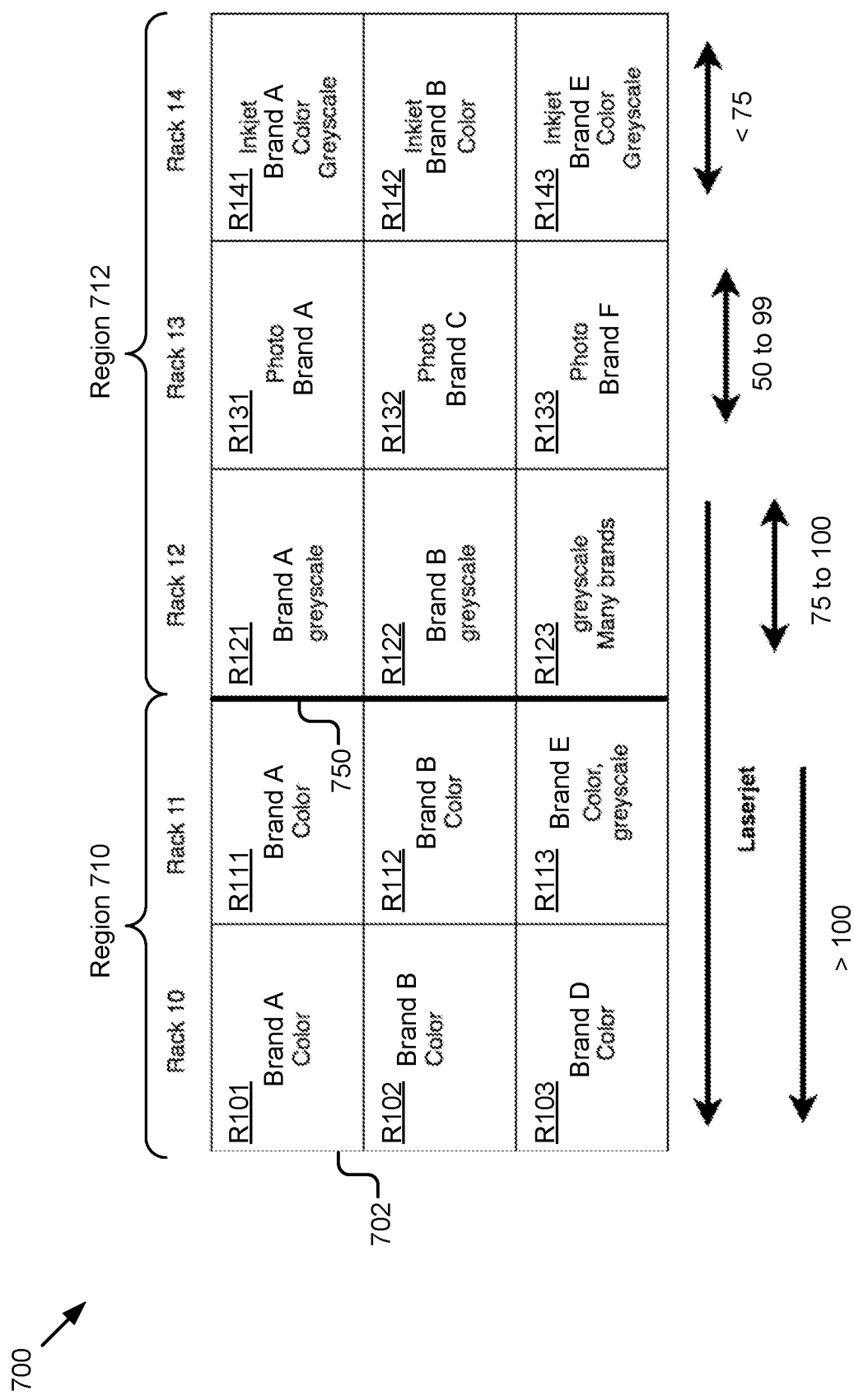
FIG. 7 illustrates an example item layout map of a shelving unit.

In some embodiments, the ontology generator 230 may map the item data of the one or more item types to the planogram of the shelving unit to generate the item layout map of the shelving unit. The item layout map may indicate the attribute values of the product attributes for one or more item types that are stored in a space unit of the shelving unit. FIG. 7 illustrates an example item layout map of a shelving unit 702. As depicted, the shelving unit 702 may include 5 racks (e.g., R10-R14), each rack may include 3 shelves to store various item types of product category "printer." In this item layout map, the shelves and the walls of each rack may be considered as space dividers that divide the shelving unit 702 into multiple space units (e.g., R101-R143). As depicted in FIG. 7, the item layout map may indicate that the item type(s) stored in the space unit R101 have the attribute value of the product attribute "brand name" as "Brand A" and the attribute value of product attribute "color type" as "color." Similarly, the item layout map may indicate that the item type(s) stored in the space unit R143 have the attribute value of the product attribute "brand name" as "Brand E," the attribute value of the product attribute "cartridge type" as "inkjet," and the attribute value of the product attribute "color type" as "color" and "greyscale."

In some embodiments, to generate the ontology data for providing user assistance to the users, the ontology generator 230 may analyze the item layout map based on a product attribute of the product category. Given the attribute values of the product attribute that are associated with the item types stored on the shelving unit, the ontology generator 230 may divide the shelving unit into one or more regions based on these attribute values of the product attribute. Thus, the ontology generator 230 may determine the region of the shelving unit where a majority of the item types stored therein have the same attribute value for the product attribute. As a result, the robotic device 106 may instruct the user to navigate to that region if the user is interested in the item type having the product attribute of that attribute value.

In block 304, the ontology generator 230 may determine one or more product attributes associated with the product category. For example, the ontology generator 230 may determine that the product category "printer" is associated with product attribute "brand name," product attribute "cartridge type," product attribute "paper type," product attribute "color type," etc.

In block 306, the ontology generator 230 may determine one or more divider configurations of the shelving unit. In some embodiments, to determine a divider configuration, the ontology generator 230 may activate one or more space dividers and inactivate other space dividers of the shelving unit. The activated space dividers in the divider configuration may divide the shelving unit into one or more candidate regions, a candidate region may include one or more space units. The candidate regions formed by the divider configuration may be referred to herein as the candidate regions associated with the divider configuration. FIG. 7 illustrates an example divider configuration 700 of the shelving unit 702. In this divider configuration, the ontology generator 230 may activate the space divider 750 between rack R11 and rack R12 and inactive other space dividers of the shelving unit 702. As illustrated, the divider configuration 700 may divide the shelving unit 702 into the candidate region 710 and the candidate region 712. The candidate region 710 may include the space units of rack R10 and the space units of rack R11, and the candidate region 712 may include the space units of rack R12, the space units of rack R13, and the space units of rack R14.

In block 308, for a product attribute in the one or more product attributes associated with the product category and a divider configuration in the one or more divider configurations of the shelving unit, the ontology generator 230 may generate an ontology entry associated with the product attribute and the divider configuration based on the item layout map of the shelving unit and the divider configuration. In some embodiments, for each product attribute in the one or more product attributes and each divider configuration in the one or more divider configurations, the ontology generator 230 may evaluate the information gain ratio associated with the product attribute and the divider configuration to determine whether to generate and store an ontology entry associated with the product attribute and the divider configuration, and generate the ontology entry for this combination accordingly.

As discussed above, the divider configuration may divide the shelving unit into one or more candidate regions. In some embodiments, an information gain may indicate the amount of information gained (e.g., additional data stored in memory) by dividing the shelving unit into the candidate regions and evaluating the attribute values of the product attribute in the candidate regions, as compared to evaluating the attribute values of the product attribute in the entire shelving unit as a whole. In some embodiments, the information gain ratio may be the ratio between the information gain and an intrinsic factor. In some embodiments, the product attribute may have n attribute values, and the intrinsic factor may indicate the general information gain generated by dividing a dataset (e.g., a set of space units associated with various attribute values of the product attribute) into n subsets based on the attribute value of the product attribute. As discussed further below, the ontology generator 230 may compute the information gain ratio and generate the ontology entry associated with the product attribute and the divider configuration based on one or more entropy values.

Figure 4:
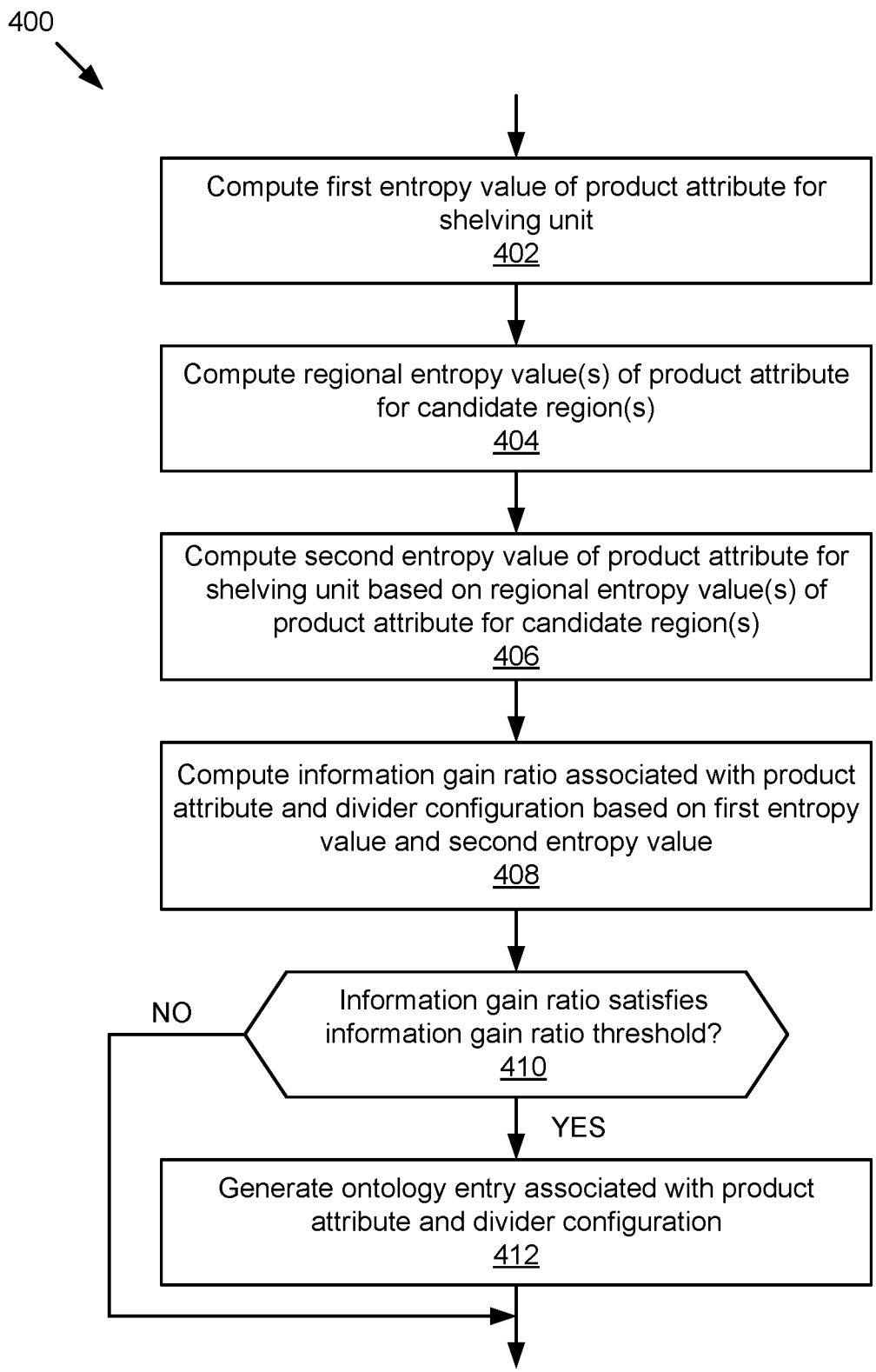
FIG. 4 is a flowchart of an example method for generating an ontology entry associated with a product attribute and a divider configuration.

FIG. 4 is a flowchart of an example method 400 for generating an ontology entry associated with a product attribute and a divider configuration. For example, for the product attribute "brand name" associated with the product category "printer" and the divider configuration 700 of the shelving unit 702 on which the item types of the product category "printer" are stored, the ontology generator 230 may evaluate the information gain ratio associated with the product attribute "brand name" and the divider configuration 700 illustrated in FIG. 7, and generate an ontology entry associated with the product attribute "brand name" and the divider configuration 700.

In block 402, the ontology generator 230 may compute the first entropy value of the product attribute for the shelving unit. In some embodiments, the ontology generator 230 may determine the probability of space units in the shelving unit that are associated with each attribute value of the product attribute, and compute the first entropy value of the product attribute for the shelving unit based on these probabilities. In the example depicted in FIG. 7, the ontology generator 230 may determine that the product attribute "brand name" has 7 attribute values (e.g., "Brand A," "Brand B," "Brand C," "Brand D," "Brand E," "Brand F," and "many brand"). The ontology generator 230 may determine that the shelving unit 702 includes 15 space units, 5 of which are associated with the attribute value "Brand A" of the product attribute "brand name." Thus, the ontology generator 230 may determine the probability of space units in the shelving unit 702 that are associated with the attribute value "Brand A" of the product attribute "brand name" to be 5/15. Other probabilities of space units in the shelving unit 702 that are associated with other attribute values of the product attribute "brand name" may be determined in a similar manner.

In some embodiments, the ontology generator 230 may aggregate the attribute values that have a relatively low probability of space units associated with them into a common attribute value. As depicted in FIG. 7, the shelving unit 702 may include 1 space unit associated with the attribute value "Brand C" (e.g., the space unit R132), and 1 space unit associated with the attribute value "Brand D" (e.g., the space unit R103). In this example, the ontology generator 230 may determine that the probability of space units in the shelving unit 702 that are associated with the attribute value "Brand C" and the probability of space units in the shelving unit 702 that are associated with the attribute value "Brand D" satisfy a probability threshold (e.g., less than 0.1). Thus, the ontology generator 230 may aggregate the attribute value "Brand C" and the attribute value "Brand D" into a common attribute value "Miscellaneous" and assign this aggregated attribute value "Miscellaneous" to both the space unit R132 and the space unit R103. Thus, the ontology generator 230 may determine that the shelving unit 702 includes 2 space units associated with the attribute value "Miscellaneous," and may determine the probability of space units in the shelving unit 702 that are associated with the attribute value "Miscellaneous" to be 2/15. This implementation is advantageous because it can replace the attribute value associated with a relatively low number of space units with the aggregated attribute value associated with a higher number of space units in the shelving unit, thereby simplifying the entropy computation.

In some embodiments, the ontology generator 230 may compute the first entropy value of the product attribute for the shelving unit based on the probability of space units in the shelving unit that are associated with each attribute value of product attribute. In some embodiments, the ontology generator 230 may determine the first entropy value of the product attribute for the shelving unit based on these probabilities using the following Equation 1:

$$\text{Entropy} = -\Sigma p_i * \log_2(p_i) \quad \text{[Equation 1]}$$

In block 404, for each candidate region generated by the divider configuration, the ontology generator 230 may determine a regional entropy value of the product attribute for the candidate region. Similar to computing the first entropy value of the product attribute for the shelving unit, the ontology generator 230 may determine the probability of space units in the candidate region that are associated with each attribute value of the product attribute, and compute the regional entropy value of the product attribute for the candidate region based on these probabilities. Continuing the example depicted in FIG. 7, the ontology generator 230 may determine the regional entropy value of the product attribute "brand name" for the candidate region 710 and the regional entropy value of the product attribute "brand name" for the candidate region 712. For the candidate region 710, the ontology generator 230 may determine that the candidate region 710 includes 6 space units and 2 of which are associated with the attribute value "Brand A" of the product attribute "brand name." Thus, the ontology generator 230 may determine the probability of space units in the candidate region 710 that are associated with the attribute value "Brand A" of the product attribute "brand name" to be 2/6. Other probabilities of space units in the candidate region 710 that are associated with other attribute values of the product attribute "brand name" may be determined in a similar manner. The ontology generator 230 may then determine the regional entropy value of the product attribute "brand name" for the candidate region 710 based on these probabilities using Equation 1.

In some embodiments, the regional entropy value of the product attribute for the candidate region may indicate a purity level of attribute values of the product attribute in the candidate region. If the regional entropy value of the product attribute is relatively low (e.g., less than 0.35), the candidate region may include a large number of space units that store the item types having the same attribute value of the product attribute and a limited number of space units that store the item types having other attribute values of the product attribute. If the regional entropy value of the product attribute is relatively high (e.g., equal to or higher than 0.35), the candidate region may include a large number of the space units in which one space unit stores the item types having the attribute value of the product attribute different from the item types stored in another space unit of the candidate region.

In some embodiments, the ontology generator 230 may store the regional entropy values of the product attribute for the candidate regions in the data store 206 so that the regional entropy values can be re-used when the ontology generator 230 computes the information gain ratio and/or generates the ontology entry for other divider configurations, and thus the amount of computation can be reduced. In some embodiments, to compute the regional entropy value of the product attribute for a first candidate region that includes a second candidate region and a third candidate region, the ontology generator 230 may retrieve the regional entropy value of the product attribute for the second candidate region and the regional entropy value of the product attribute for the third candidate region from the data store 206. The ontology generator 230 may then compute the regional entropy value of the product attribute for the first candidate region based on these regional entropy values. In some embodiments, instead of computing the regional entropy value of the product attribute for the first candidate region, the ontology generator 230 may determine the upper limit and the lower limit of the regional entropy value of the product attribute for the first candidate region based on these regional entropy values.

In some embodiments, for each candidate region of the shelving unit, the ontology generator 230 may store the number of space units in the candidate region that are associated with each attribute value of the product attribute in the data store 206. This implementation may be advantageous because if the candidate region expands or reduces (e.g., when merging adjacent candidate regions, evaluating other divider configurations, etc.), the ontology generator 230 may re-use the numbers of space units to compute the number of space units in the adjusted candidate region that are associated with each attribute value of the product attribute, instead of re-counting these space units for the adjusted candidate region from 0. As a result, the amount of computation can be reduced.

In block 406, the ontology generator 230 may compute a second entropy value of the product attribute for the shelving unit based on the regional entropy values of the product attribute for the candidate regions. In some embodiments, the second entropy value of the product attribute for the shelving unit may be the weighted average value of the regional entropy values of the product attribute for the candidate regions. Continuing the example depicted in FIG. 7, the ontology generator 230 may determine the regional entropy value of the product attribute "brand name" for the candidate region 710 to be 0.75, and the regional entropy value of the product attribute "brand name" for the candidate region 712 to be 0.6. In this example, the candidate region 710 may include 6 space units and the candidate region 712 may include 9 space units among 15 space units of the shelving unit 702. Thus, the ontology generator 230 may determine the second entropy value of the product attribute "brand name" for the shelving unit 702 to be ($6/15*0.75+ 9/15*0.6$)=0.66.

In block 408, the ontology generator 230 may compute the information gain ratio associated with the product attribute and the divider configuration based on (1) the first entropy value of the product attribute for the shelving unit and (2) the second entropy value of the product attribute for the shelving unit. In some embodiments, to compute the information gain ratio, the ontology generator 230 may determine the information gain obtained by evaluating the attribute values of the product attribute in the candidate regions generated by the divider configuration as compared to evaluating the attribute values of product attribute in the entire shelving unit as a whole. The information gain may be the difference between the first entropy value of the product attribute for the shelving unit and the second entropy value of the product attribute for the shelving unit. In some embodiments, the ontology generator 230 may then determine the information gain ratio associated with the product attribute and the divider configuration by dividing the computed information gain to the intrinsic factor.

In block 410, the ontology generator 230 may determine whether the information gain ratio associated with the product attribute and the divider configuration satisfies an information gain ratio threshold (e.g., more than 0.35). If in block 410, the ontology generator 230 determines that the information gain ratio associated with the product attribute and the divider configuration satisfies the information gain ratio threshold, the ontology generator 230 may determine that evaluating the attribute values of the product attribute in the candidate regions results in sufficient information gain as compared to evaluating the attribute values of the product attribute in the entire shelving unit. In this case, the method 400 proceeds to block 412. In block 412, the ontology generator 230 may generate the ontology entry associated with the product attribute and the divider configuration. If in block 410, the ontology generator 230 determines that the information gain ratio associated with the product attribute and the divider configuration does not satisfy the information gain ratio threshold, the method 400 may end without generating the ontology entry associated with the product attribute and the divider configuration.

As discussed elsewhere herein, the ontology generator 230 may perform method 400 for each combination of a product attribute in the one or more product attributes of the product category and a divider configuration in the one or more divider configurations of the shelving unit. Thus, the ontology generator 230 may generate one or more ontology entries for one or more pairs, each of which may include a product attribute and a divider configuration, that have the information gain ratio satisfying the information gain ratio threshold, as discussed above. Alternatively, the ontology generator 230 may rank the information gain ratios associated with various pairs. The ontology generator 230 may determine a predefined number of pairs that have the highest information gain ratio and generate the ontology entries for these pairs. Other implementations to determine the combination of a product attribute and a divider configuration for which the ontology entry is generated are also possible and contemplated.

In some embodiments, to generate the ontology entry associated with the product attribute and the divider configuration, the ontology generator 230 may aggregate one or more of the following data elements into the ontology entry: the product category (e.g., product category "printer"), the product attribute (e.g., product attribute "brand name"), the divider configuration specifying the activated dividers and/or the inactivated dividers of the shelving unit (e.g., indicating that the space divider 750 between rack R11 and rack R12 is activated), the one or more candidate regions of the shelving unit generated by the divider configuration (e.g., the candidate region 710 and the candidate region 712), the regional entropy values of the product attribute for the candidate regions (e.g., the regional entropy value of the product attribute "brand name" for the candidate region 710 is 0.75 and the regional entropy value of the product attribute "brand name" for the candidate region 710 is 0.6), etc. By indicating the regional entropy values of the product attribute for the candidate regions generated by the divider configuration, the ontology entry may describe the organization pattern of the item types on the shelving unit with regards to the product attribute (e.g., product attribute "brand name"). As discussed elsewhere herein, if the candidate region has a relatively low regional entropy value of the product attribute (e.g., less than 0.35), the candidate region may be considered relatively "pure" because a relatively high number of space units in that candidate region may store the item types having the same attribute value for that product attribute (e.g., same brand name "Brand A").

Referring back to FIG. 3, in block 310, the ontology generator 230 may store the ontology entry associated with the product attribute and the divider configuration in the data store 206. The robotic device 106 may retrieve the ontology entry from the data store 206, generate a guidance instruction related to the product attribute of the product category based on the ontology entry, and provide the guidance instruction to the user. In some embodiments, the ontology generator 230 may generate and/or update the ontology entries in the data store 206 periodically (e.g., once a day). This implementation may be advantageous because the robotic device 106 may use up-to-date ontology data to generate guidance instruction for the users.

Figure 5:
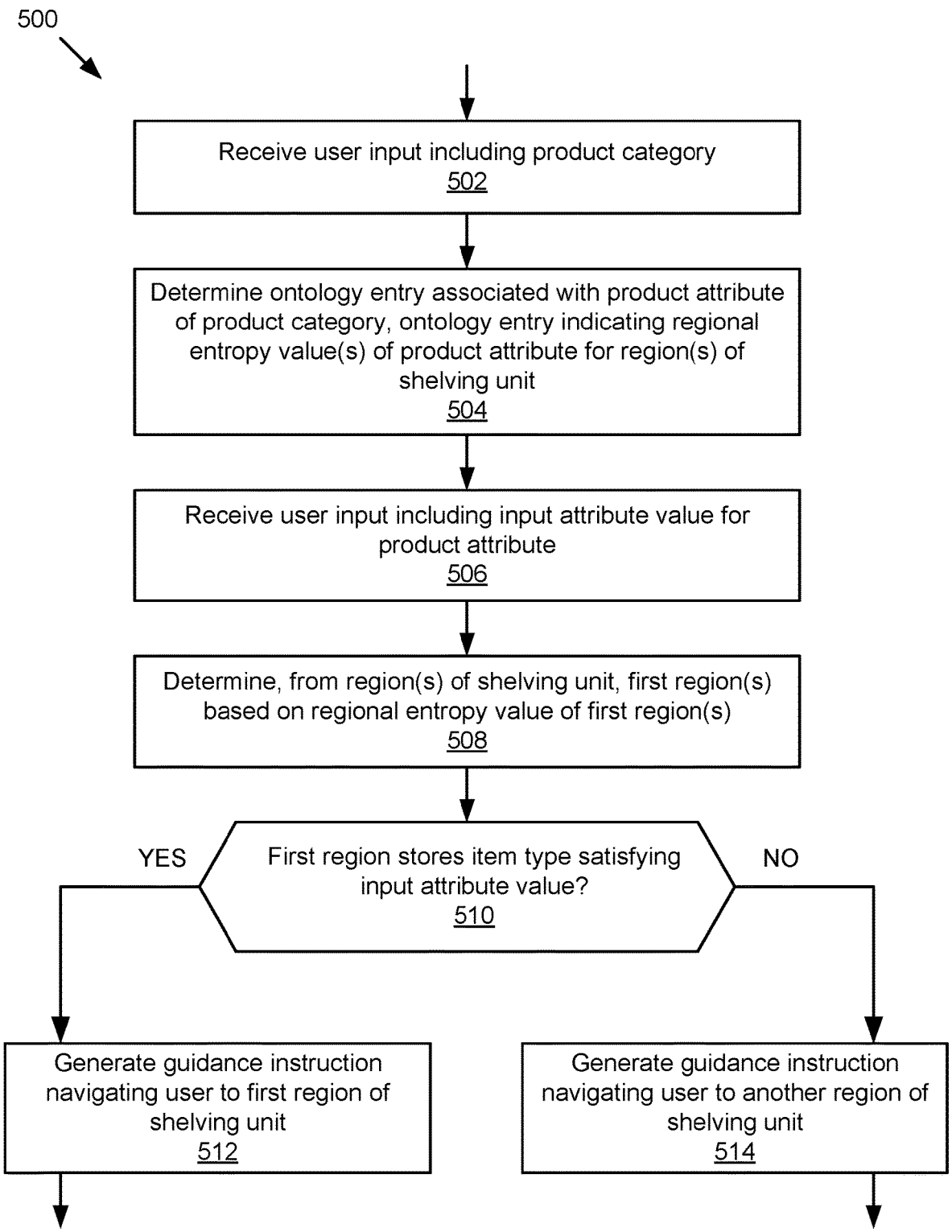
FIG. 5 is a flowchart of an example method for generating a guidance instruction for a user.

FIG. 5 is a flowchart of an example method 500 for generating a guidance instruction for a user. In some embodiments, the method 500 may be performed by the user assistance application 110 implemented in the robotic device 106. For example, the user assistance application 110 may generate a guidance instruction to navigate the user to a storage location of the item types in which the user is interested. In block 502, the guidance generator 232 may receive a user input including a product category from the user. In some embodiments, the guidance generator 232 may deploy the conversational model so that the robotic device 106 may automatically initiate a conversational dialog with the user. For example, the robotic device 106 may ask "Hello, what type of product are you looking for?" In response to this question, the user may answer "I'm looking for printers." The guidance generator 232 may apply the conversational model to analyze the user input, and determine the product category included in the user input. In this example, the guidance generator 232 may determine the product category in the user input to be product category "printer."

In block 504, the guidance generator 232 may determine one or more ontology entries associated with the product category in the user input. The ontology entries associated with the product category may be associated with different product attributes of the product category. As an example, the guidance generator 232 may retrieve one or more ontology entries associated with the product category "printer" from the data store 206. The guidance generator 232 may determine that among the ontology entries associated with the product category "printer," the first ontology entry is associated with the product attribute "brand name," the second ontology entry is associated with the product attribute "price," and the third ontology entry is associated with the product attribute "cartridge type." Thus, these ontology entries may describe how the item types belonging to the product category "printer" are organized on the shelving unit with regards to brand name, price, or cartridge type. In some embodiments, the guidance generator 232 may randomly select an ontology entry from the ontology entries associated with the product category to generate the guidance instruction for the user. For example, the guidance generator 232 may select the second ontology entry associated with the product attribute "price." As discussed elsewhere herein, the ontology entry may indicate the product category, the product attribute, the divider configuration, the regions of the shelving unit generated by the divider configuration, the regional entropy values of the product attribute for these regions of the shelving unit, etc.

In block 506, the guidance generator 232 may receive another user input from the user, the user input may include an input attribute value provided by the user for the product attribute associated with the ontology entry. In some embodiments, the robotic device 106 may continue the conversational dialog with the user based on the product attribute associated with the ontology entry using the conversational model. Continuing the above example, the robotic device 106 may ask "What type of price range do you have in mind?" In response to this question, the user may answer "Probably between $100 and $200." The guidance generator 232 may apply the conversational model to analyze the user input, and determine the input attribute value for the product attribute of the product category in the user input. In this example, the guidance generator 232 may determine the input attribute value for the product attribute "price" to be the price range [$100 to $200].

In block 508, the guidance generator 232 may determine a first region from one or more regions of the shelving unit based on the ontology entry. In some embodiments, the guidance generator 232 may analyze the ontology entry and determine one or more first regions in the shelving unit based on the regional entropy values of the product attribute for the first regions. In some embodiments, the guidance generator 232 may reference the ontology entry, determine that a region of the shelving unit has the regional entropy value of the product attribute for the region satisfying a regional entropy value threshold (e.g., less than 0.35), and determine this region of the shelving unit to be a first region. Continuing the above example, the guidance generator 232 may determine one or more first regions from the candidate region 710 and the candidate region 712 of the shelving unit 702 illustrated in FIG. 7. In this example, the guidance generator 232 may determine that the candidate region 710 has the regional entropy value of the product attribute "price" (e.g., 0.3) that satisfies the regional entropy value threshold (e.g., less than 0.35). Thus, the guidance generator 232 may determine the candidate region 710 to be the first region. As discussed elsewhere herein, the regional entropy value of the product attribute for a region in the shelving unit may indicate the purity level of attribute values of the product attribute in the region. If the regional entropy value of the product attribute for the first region is relatively low (e.g., less than 0.35), the first region may include a relatively high number of space units that store the item types having same attribute value for the product attribute.

In block 510, for a first region in the one or more first regions of the shelving unit, the guidance generator 232 may determine whether the first region stores an item type satisfying the input attribute value of the product attribute received from the user. In some embodiments, the guidance generator 232 may determine one or more attribute values of the product attribute of one or more item types stored in the first region. The guidance generator 232 may map the first region to the item layout map of the shelving unit and determine the attribute values that the item types in the first region have for the product attribute. In some embodiments, the guidance generator 232 may then generate the guidance instruction for the user based on the attribute values of the product attribute of the item types in the first region and the input attribute value provided by the user. The guidance instruction may navigate the user to storage position of one or more item types that satisfy the input attribute value in the shelving unit.

In some embodiments, to generate the guidance instruction, the guidance generator 232 may perform a comparison between the attribute values of the product attribute of the item types in the first region and the input attribute value of the product attribute. If one or more item types in the first region have the attribute values of the product attribute satisfying the input attribute value of the product attribute provided by the user, the guidance generator 232 may determine that the first region stores at least an item type satisfying the input attribute value. If the item types in the first region do not have the attribute values of the product attribute thereby satisfying the input attribute value of the product attribute provided by the user, the guidance generator 232 may determine that the first region does not store an item type satisfying the input attribute value. If, in block 510, the guidance generator 232 determines that the first region stores at least an item type satisfying the input attribute value, the method 500 may proceed to block 512. In block 512, the guidance generator 232 may generate the guidance instruction navigating the user to the first region of the shelving unit to find the item types of interest. The robotic device 106 may then provide the guidance instruction to the user in the conversational dialog with the user.

Continuing the above example, the guidance generator 232 may map the candidate region 710 to the item layout map of the shelving unit 702, and determine that the space units in the candidate region 710 store the item types having the price higher than $100. Thus, the guidance generator 232 may determine that the candidate region 710 stores one or more types of printers that satisfy the input attribute value of the product attribute "price" provided by the user (e.g., within the price range [$100 to $200]). Therefore, the guidance generator 232 may generate the guidance instruction navigating the user to the candidate region 710 to find the printers of interest, and the robotic device 106 may communicate the guidance instruction in the conversational dialog with the user. In this example, the candidate region 710 may include rack R10 and rack R11 of the shelving unit 702 in storage aisle 3 as depicted in FIG. 7. Thus, in response to the user input of the price range for printers, the robotic device 106 may state "Please go to storage aisle 3, printers in your price range are in rack R10 and rack R11. Please note that some printers may have price higher than $200." The guidance generator 232 may also display the facility map of the retail store to the user on the output device 212 of the robotic device 106 (e.g., LED-based screen). The facility map may include location indicators indicating the rack R10 and rack R11 of the shelving unit 702 and the current position of the user in the retail store. In some embodiments, the robotic device 106 and/or another robotic device 106 may navigate to the rack R10 and rack R11 of the shelving unit 702, and thus the user may follow the robotic device 106 to get to the storage positions of the printers of interest.

If, in block 510, the guidance generator 232 determines that the first region does not store an item type that satisfies the input attribute value, the method 500 may proceed to block 514. In block 514, the guidance generator 232 may generate the guidance instruction navigating the user to another region of the shelving unit to find the item types of interest. In some embodiments, the guidance instruction generated in this situation may have a lower detail level as compared to the guidance instruction generated in case the first region stores at least an item type satisfying the input attribute value. In some embodiments, if the first region does not store an item type satisfying the input attribute value provided by the user, the guidance instruction may not navigate the user to a particular region of the shelving unit. Instead, the guidance instruction may generally navigate the user to the shelving unit, or to one or more other regions of the shelving unit that also store the item types not satisfying the input attribute value provided by the user. The robotic device 106 may then provide the guidance instruction to the user in the conversational dialog with the user.

Continuing the above example, assuming that the user provided the input attribute value for product attribute "price" to be [lower than $80] rather than within [$100 to $200]. As discussed above, the guidance generator 232 may determine that the candidate region 710 has the regional entropy value of the product attribute "price" satisfying the regional entropy value threshold (e.g., less than 0.35) while the candidate region 712 does not. Thus, in this example, the candidate region 710 may include a large number of space units associated with the same attribute value of the product attribute "price" while the candidate region 712 may include a mixture of space units associated with various attribute values of the product attribute "price." As depicted in FIG. 7, the candidate region 710 may include the space units R101, R102, R103, R111, R112, R113 associated with the price range [higher than $100]. The candidate region 712 may include the space units R121, R122, R123 associated with the price range [$75 to $100], the space units R131, R132, R133 associated with the price range [$50 to $99], and the space units R141, R142, R143 associated with the price range [lower than $75]. Thus, the guidance generator 232 may determine that, while the candidate region 710 includes a large number of space units associated with the same attribute value of the product attribute "price," the attribute value of the product attribute "price" (e.g., higher than $100) does not satisfy the input attribute value for product attribute "price" provided by the user.

In this example, the guidance generator 232 may generate a general guidance instruction to navigate the user to the shelving unit 702. Thus, in response to the user input of the price range for printers, the robotic device 106 may state: "Please go to storage aisle 3 to find printers. Printers in your price range may be placed in various areas of this storage aisle." Alternatively, the guidance generator 232 may generate the guidance instruction to navigate the user to the candidate region 712 of the shelving unit 702. As depicted in FIG. 7, the candidate region 710 may include racks R12, R13, R14 of the shelving unit 702. Thus, the robotic device 106 may state "Please go to storage aisle 3 to find printers. Printers in your price range may be in rack R12, R13, R14 but may be mixed up with other printers not in your price range." Alternatively, the guidance generator 232 may generate an assistant message suggesting the user to seek help from a human assistant. For example, the robotic device 106 may state "Printers are stored in storage aisle 3. Printers in your price range may be mixed up with other printers not in your price range. Do you want me to find you a store assistant?" In response to this question, the user may provide a user input requesting human assistance. For example, the user may answer "Yes, please." In some embodiments, responsive to receiving the user input requesting human assistance, the guidance generator 232 may send a human assistance request to the server 104. For instance, the human assistance request may include the current position of the robotic device 106 in the facility, and may request an available human assistant to navigate to the current position of the robotic device 106 to assist the user in finding the item types of interest.

The operations discussed above for generating the ontology data and generating the guidance instruction for the user based on the ontology data are illustrated in framework 600 depicted in FIG. 6. As discussed elsewhere herein, a product category may include one or more item types stored on a shelving unit. The product category may also be associated with one or more product attributes. In operation 620, the user assistance application 110 may generate the item layout map for the product category from the planogram data 602 and the item data 604. As discussed elsewhere herein, the item layout map may indicate the attribute values of the product attributes for one or more item types that are stored in each space unit of the shelving unit. The user assistance application 110 may also activate one or more space dividers of the shelving unit to determine one or more divider configurations of the shelving unit. The activated space dividers may divide the shelving unit into one or more candidate regions associated with the divider configuration.

In operation 622, for each product attribute of the product category and each divider configuration of the shelving unit, the user assistance application 110 may compute the regional entropy values of the product attribute for the candidate regions generated by the divider configuration. The user assistance application 110 may compute the first entropy value of the product attribute for the shelving unit in which the entire shelving unit is considered as a whole, and compute the second entropy value of the product attribute for the shelving unit in which the shelving unit is considered with the candidate regions. The user assistance application 110 may then compute the information gain ratio associated with the product attribute and the divider configuration based on (1) the first entropy value of the product attribute for the shelving unit and (2) the second entropy value of the product attribute for the shelving unit. If the information gain ratio associated with the product attribute and the divider configuration satisfies the information gain ratio threshold, the user assistance application 110 may generate an ontology entry associated with the product attribute and the divider configuration, and store the ontology entry as the ontology and location data 606. As discussed elsewhere herein, the ontology entry may indicate the regional entropy values of the product attribute for the candidate regions generated by the divider configuration.

In operation 624, the user assistance application 110 may rely on the ontology data derived in operation 622 to define the product attributes of the product category that can be used to generate guidance instruction related to the product category for the user. The user assistance application 110 may automatically deploy the conversational model to initiate or continue a conversational dialog with the user based on these product attributes. For example, in operation 626, the user assistance application 110 may communicate with the user based on the product attribute using the conversational model, and determine the input attribute value for the product attribute from the user input. The user assistance application 110 may then generate the guidance instruction for the user using the ontology and location data 606. For example, the user assistance application 110 may retrieve an ontology entry associated with the product attribute and a divider configuration, and determine the region of the shelving unit based on the ontology entry. The region of the shelving unit may have the regional entropy value of the product attribute for the region satisfying a regional entropy value threshold and may store at least an item type satisfying the input attribute value for the product attribute provided by the user. The user assistance application 110 may then generate the guidance instruction navigating the user to the region of the shelving unit to find item types of interest, and provide the guidance instruction to the user.

It should be noted that the components described herein may be further delineated or changed without departing from the techniques described herein. For example, the processes described throughout this disclosure may be performed by fewer, additional, or different components.

It should be understood that the methods described herein are provided by way of example, and that variations and combinations of these methods, as well as other methods, are contemplated. For example, in some implementations, at least a portion of one or more of the methods represent various segments of one or more larger methods and may be concatenated or various steps of these methods may be combined to produce other methods which are encompassed by the present disclosure. Additionally, it should be understood that various operations in the methods are iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details in various cases. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input and/or output devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions, and/or formats.

Furthermore, the modules, routines, features, attributes, methodologies and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
   receiving, by one or more processors, a user input including an input attribute value for a product attribute associated with an ontology entry, the ontology entry indicating one or more regional entropy values;
   determining, by the one or more processors, a first region from one or more regions of a shelving unit based on a regional entropy value of the product attribute for the first region;
   determining, by the one or more processors, one or more attribute values of the product attribute of one or more item types stored in the first region;
   generating, by the one or more processors, a guidance instruction to the first region associated with the input attribute value based on the one or more attribute values of the product attribute of the one or more item types in the first region and the input attribute value, the guidance instruction providing an instruction to a location of the determined first region; and
   providing, by the one or more processors, the guidance instruction to a user via a user interface device.

2. The method of claim 1, wherein generating the guidance instruction includes:
   generating the guidance instruction to navigate the user to a storage position of an item type that satisfies the input attribute value in the shelving unit based on the one or more attribute values of the product attribute of the one or more item types in the first region and the input attribute value.

3. The method of claim 1, further comprising:
   determining, by the one or more processors, the ontology entry associated with the product attribute of a product category, the product category including the one or more item types placed on the shelving unit, the ontology entry indicating the one or more regional entropy values of the product attribute for the one or more regions of the shelving unit.

4. The method of claim 1, wherein:
   the regional entropy value of the product attribute for a region in the shelving unit indicates a purity level of attribute values of the product attribute in the region; and
   determining the first region from the one or more regions of the shelving unit includes:
      determining that the first region has the regional entropy value of the product attribute for the first region satisfying a regional entropy value threshold.

5. The method of claim 1, wherein generating the guidance instruction includes:
   performing a comparison between the one or more attribute values of the product attribute of the one or more item types in the first region and the input attribute value;
   determining that the first region stores an item type satisfying the input attribute value based on the comparison; and
   responsive to determining that the first region stores the item type satisfying the input attribute value, generating the guidance instruction to the first region of the shelving unit.

6. The method of claim 1, wherein:
   the shelving unit includes one or more space units; and
   determining the one or more attribute values of the product attribute of the one or more item types stored in the first region includes:
      mapping the first region to an item layout map of the shelving unit, the item layout map indicating the one or more attribute values of one or more product attributes of an item type stored in a space unit of the shelving unit.

7. The method of claim 1, wherein:
   receiving the input attribute value from the user includes receiving the input attribute value in a conversational dialog with the user; and
   providing the guidance instruction to the user includes providing the guidance instruction to the user in the conversational dialog with the user.

8. The method of claim 1, further comprising:
   determining one or more divider configurations of the shelving unit, a divider configuration in the one or more divider configurations dividing the shelving unit into one or more candidate regions.

9. The method of claim 8, further comprising:
   generating the ontology entry associated with the product attribute and the divider configuration in the one or more divider configurations based on an item layout map and the divider configuration of the shelving unit, the ontology entry indicating the one or more regional entropy values of the product attribute for the one or more candidate regions generated by the divider configuration.

10. The method of claim 9, wherein generating the ontology entry associated with the product attribute and the divider configuration includes:
computing the regional entropy value of the product attribute for a candidate region of the one or more candidate regions based on a probability of space units in the candidate region that are associated with an attribute value of the product attribute.

11. The method of claim 9, further comprising:
computing a first entropy value of the product attribute for the shelving unit based on a probability of space units in the shelving unit that are associated with an attribute value of the product attribute; and
computing a second entropy value of the product attribute for the shelving unit based on the one or more regional entropy values of the product attribute for the one or more candidate regions generated by the divider configuration.

12. The method of claim 11, further comprising:
computing an information gain ratio associated with the product attribute and the divider configuration based on the first entropy value of the product attribute for the shelving unit and the second entropy value of the product attribute for the shelving unit;
determining that the information gain ratio associated with the product attribute and the divider configuration satisfies an information gain ratio threshold; and
responsive to determining that the information gain ratio associated with the product attribute and the divider configuration satisfies the information gain ratio threshold, generating the ontology entry associated with the product attribute and the divider configuration.

13. A system comprising:
one or more processors; and
a memory storing instructions that, when executed by the one or more processors, cause the system to:
receive a user input including an input attribute value for a product attribute associated with an ontology entry, the ontology entry indicating one or more regional entropy values;
determine a first region from one or more regions of a shelving unit based on a regional entropy value of the product attribute for the first region;
determine one or more attribute values of the product attribute of one or more item types stored in the first region;
generate a guidance instruction to the first region associated with the input attribute value based on the one or more attribute values of the product attribute of the one or more item types in the first region and the input attribute value; and
provide the guidance instruction to a user.

14. The system of claim 13, wherein generating the guidance instruction includes:
generating the guidance instruction to navigate the user to a storage position of an item type that satisfies the input attribute value in the shelving unit based on the one or more attribute values of the product attribute of the one or more item types in the first region and the input attribute value.

15. The system of claim 13, further comprising:
determining, by the one or more processors, the ontology entry associated with the product attribute of a product category, the product category including the one or more item types placed on the shelving unit, the ontology entry indicating the one or more regional entropy values of the product attribute for the one or more regions of the shelving unit.

16. The system of claim 13, wherein:
the regional entropy value of the product attribute for a region in the shelving unit indicates a purity level of attribute values of the product attribute in the region; and
determining the first region from the one or more regions of the shelving unit includes:
determining that the first region has the regional entropy value of the product attribute for the first region satisfying a regional entropy value threshold.

17. The system of claim 13, wherein generating the guidance instruction includes:
performing a comparison between the one or more attribute values of the product attribute of the one or more item types in the first region and the input attribute value;
determining that the first region stores an item type satisfying the input attribute value based on the comparison; and
responsive to determining that the first region stores the item type satisfying the input attribute value, generating the guidance instruction to the first region of the shelving unit.

18. The system of claim 13, wherein:
the shelving unit includes one or more space units; and
determining the one or more attribute values of the product attribute of the one or more item types stored in the first region includes:
mapping the first region to an item layout map of the shelving unit, the item layout map indicating the one or more attribute values of one or more product attributes of an item type stored in a space unit of the shelving unit.

19. The system of claim 13, wherein:
receiving the input attribute value from the user includes receiving the input attribute value in a conversational dialog with the user; and
providing the guidance instruction to the user includes providing the guidance instruction to the user in the conversational dialog with the user.

20. A method comprising:
determining an ontology entry including:
computing an information gain ratio associated with a product attribute and a divider configuration based on a probability of space units in a shelving unit being associated with an attribute value of the product attribute for the shelving unit and one or more regional entropy values of the product attribute for the divider configuration for the shelving unit; and
responsive to determining that the information gain ratio associated with the product attribute and the divider configuration satisfies an information gain ratio threshold, generating the ontology entry associated with the product attribute and the divider configuration;
receiving a user input including an input attribute value for the product attribute associated with the ontology entry, the ontology entry indicating the one or more regional entropy values;
determining a region from one or more regions of the shelving unit based on a regional entropy value of the product attribute for the region;
determining one or more attribute values of the product attribute of one or more item types stored in the region;

generating a guidance instruction to the determined region associated with the input attribute value based on the one or more attribute values of the product attribute of the one or more item types in the region and the input attribute value; and
providing the guidance instruction to a user.

\* \* \* \* \*